US009383703B2

(12) United States Patent
Kaneda

(10) Patent No.: US 9,383,703 B2
(45) Date of Patent: Jul. 5, 2016

(54) LINE WIDTH CORRECTION AND TAILING SUPPRESSION

(71) Applicant: CANON KABUSHIKI KAISHA, Tokyo (JP)

(72) Inventor: Kanako Kaneda, Kamakura (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/097,755

(22) Filed: Dec. 5, 2013

(65) Prior Publication Data

US 2014/0168665 A1 Jun. 19, 2014

(30) Foreign Application Priority Data

Dec. 14, 2012 (JP) ................................ 2012-273672

(51) Int. Cl.
*G06T 5/00* (2006.01)
*H04N 1/407* (2006.01)
*G03G 15/00* (2006.01)

(52) U.S. Cl.
CPC .......... *G03G 15/5025* (2013.01); *G03G 15/657* (2013.01)

(58) Field of Classification Search
USPC ........................ 358/2.1, 3.26, 2.99, 3.27, 532
See application file for complete search history.

(56) References Cited

U.S. PATENT DOCUMENTS

| | | | | |
|---|---|---|---|---|
| 6,067,377 | A * | 5/2000 | Hata | 382/167 |
| 6,668,101 | B2 | 12/2003 | Kaneda | |
| 6,891,972 | B2 | 5/2005 | Kaneda | |
| 6,970,601 | B1 | 11/2005 | Kaneda et al. | |
| 7,003,152 | B1 | 2/2006 | Sawada | |
| 7,292,356 | B2 * | 11/2007 | Otokita | 358/1.13 |
| 7,440,617 | B2 | 10/2008 | Kaneda | |
| 7,519,226 | B2 | 4/2009 | Kaneda et al. | |
| 7,773,898 | B2 * | 8/2010 | Nakase | H04N 1/00002 358/1.1 |
| 8,610,961 | B2 * | 12/2013 | Nagai | 358/3.26 |
| 2007/0236739 | A1 * | 10/2007 | Murakami et al. | 358/3.06 |
| 2009/0214238 | A1 * | 8/2009 | Tanaka et al. | 399/51 |
| 2012/0162673 | A1 * | 6/2012 | Narita | 358/1.9 |

FOREIGN PATENT DOCUMENTS

| | | | |
|---|---|---|---|
| JP | 2000-206756 | A | 7/2000 |
| JP | 2009-023283 | A | 5/2009 |

* cited by examiner

*Primary Examiner* — Barbara Reinier

(74) *Attorney, Agent, or Firm* — Fitzpatrick, Cella, Harper & Scinto

(57) ABSTRACT

An image forming apparatus is provided that prevents a deteriorated print quality even if a line width correction processing and a tailing suppression processing are configured in parallel. The image forming apparatus comprises a determination unit configured to determine a tailing suppression processing specification depending on a line width correction setting for detecting an edge neighboring region of an input image subjected to a line width correction processing. The tailing suppression processing specification is used to perform a tailing suppression processing on the input image.

20 Claims, 30 Drawing Sheets

| | LINE WIDTH CORRECTION | HORIZONTAL LINE CORRECTION | LEVEL 0 | LEVEL 1 | LEVEL 2 |
|---|---|---|---|---|---|
| LINE WIDTH CORRECTION PROCESSING | OFF | — | — | — | — |
| | ON | LEFT EDGE NEIGHBORING DETECTION SETTING | OFF | ON | ON |
| | | RIGHT EDGE NEIGHBORING DETECTION SETTING | OFF | OFF | ON |

FIG.20A

| | LINE WIDTH CORRECTION | VERTICAL LINE CORRECTION | LEVEL 0 | LEVEL 1 | LEVEL 2 |
|---|---|---|---|---|---|
| LINE WIDTH CORRECTION PROCESSING | OFF | — | — | — | — |
| | ON | UPPER EDGE NEIGHBORING DETECTION SETTING | OFF | ON | ON |
| | | LOWER EDGE NEIGHBORING DETECTION SETTING | OFF | OFF | ON |

FIG.20B

| | TAILING SUPPRESSION | BkLine Cnt | ApplyLine | EdgeLine | Pattern |
|---|---|---|---|---|---|
| TAILING SUPPRESSION PROCESSING (DEFAULT) | OFF | – | – | – | – |
| | ON | 1 LINE | – | – | – |
| | | 2 LINES | – | – | – |
| | | 3 LINES | 1 | 1 | A |
| | | 4 LINES | 1 | 1 | A |
| | | 5 LINES | 2 | 1 | B |
| | | ... | ... | ... | ... |

FIG.22A

| | TAILING SUPPRESSION | BkLine Cnt | LINE WIDTH AFTER PLUMP PROCESSING | ApplyLine | EdgeLine | Pattern |
|---|---|---|---|---|---|---|
| TAILING SUPPRESSION PROCESSING (LINE WIDTH CORRECTION LEVEL 1) | OFF | – | – | – | – | – |
| | ON | 1 LINE | 2 LINES | – | – | – |
| | | 2 LINES | 3 LINES | 1 | 1 | A |
| | | 3 LINES | 4 LINES | 1 | 1 | A |
| | | 4 LINES | 5 LINES | 2 | 1 | B |
| | | 5 LINES | 6 LINES | 2 | 1 | B |
| | | ... | ... | ... | ... | ... |

FIG.22B

| | TAILING SUPPRESSION | BkLine Cnt | LINE WIDTH AFTER PLUMP PROCESSING | ApplyLine | EdgeLine | Pattern |
|---|---|---|---|---|---|---|
| TAILING SUPPRESSION PROCESSING (LINE WIDTH CORRECTION LEVEL 2) | OFF | – | – | – | – | – |
| | ON | 1 LINE | 3 LINES | 1 | 0 | A |
| | | 2 LINES | 4 LINES | 1 | 0 | A |
| | | 3 LINES | 5 LINES | 2 | 0 | B |
| | | 4 LINES | 6 LINES | 2 | 0 | B |
| | | 5 LINES | 7 LINES | 3 | 0 | C |
| | | ... | ... | ... | ... | ... |

FIG.22C

LINE WIDTH CORRECTION AND TAILING SUPPRESSION

BACKGROUND OF THE INVENTION

1. Field of the Invention

The present invention relates to an image processing technique for controlling a load amount of a color material.

2. Description of the Related Art

In a case where an image is printed by an electronic photograph-type image forming apparatus by printing a straight line image (line image) extending in a (main scanning) direction orthogonal to a conveying direction, a phenomenon may be caused as shown in FIG. 2A in which toner is scattered at a rear side in the conveying (sub scanning) direction of a line image 202 printed on a paper 201. This phenomenon is called a tailing phenomenon (hereinafter referred to as tailing). The tailing is caused, as shown in FIG. 2B, in a case where the paper 201 is rapidly heated while passing through a high-temperature fixing unit 301 to thereby cause the blowout from the paper 201 of the steam 302 of the water in the paper 201. Specifically, the blowout of the steam blows, to the rear side in the conveying direction, developer 303 (also may be called as a color material or toner) on the paper 201 prior to a fixing process.

One technique to suppress the tailing is to subject pixel data to a pattern matching to perform a culling processing on pixels matching a predetermined pattern, thereby reducing the load amount of the developer onto the paper 201 (see Japanese Patent Laid-Open No. 2009-23283). The pixel culling processing is a process to convert black pixels to white pixels or a process to convert colored pixels to colorless pixels. In the case of the electronic photograph-type image forming apparatus, an electronic photograph photoreceptor has thereon a strong electric field (which is called an edge field) formed at an edge rather than the center of an electrostatic latent image. Thus, the toner load amount increases toward the lower end of the edge of the line image in the conveying direction. Thus, more tailing can be effectively suppressed in a case where a culling process is performed on pixels closer to the lower end of the edge of the line image in the conveying direction.

On the other hand, one technique to improve the printing quality of characters and lines is to detect an edge of a character or a line to add black pixels (or to convert white pixels to black pixels) to the neighboring region of the detected edge to thereby expand the edge (line width correction processing) (see Japanese Patent Laid-Open No. 2000-206756).

In a case where a parallel configuration is realized by a tailing suppression processing unit for performing the above-described culling processing for the tailing suppression and a line width correction processing unit for performing a line width correction processing, the respective processings are independently performed to inputted pixel data. In this case, the respective processing units must consider the processings by other processing units otherwise a disadvantage as described below is cause. For example, in a case where a line image is inputted to this parallel configuration, then the respective processing units output pixel data obtained by subjecting the inputted line image to the tailing suppression processing and another pixel data subjected to a line width correction processing for expanding the edge of an inputted line image. Then, by combining these pieces of pixel data, output pixel data is finally generated. In the process of this processing, the tailing suppression processing is performed to determine to-be-culled lines and a culling pattern in the line image based on the width of the inputted line image. On the other hand, the line width correction processing expands the edge region. As a result, the inputted pixels that have originally formed the edge do not form an edge anymore. In such a case, a deteriorated image quality may be caused by a deteriorated tailing suppression effect because an image having passed the image fixing units is an image, which is obtained by the culling processing for the tailing suppression which is performed at a position away from the lower end of the edge in the conveying direction.

SUMMARY OF THE INVENTION

The image forming apparatus of the present invention includes: an line width correction processing unit that detects an edge neighboring region of an input image in a predetermined direction to subject the detected edge neighboring region to a line width correction processing; a determination unit that determines a tailing suppression processing specification depending on the predetermined direction used by the line width correction processing unit; and a tailing suppression processing unit that is provided to be parallel with the line width correction processing unit, the tailing suppression processing unit subjects the input image to a tailing suppression processing based on the tailing suppression processing specification determined by the determination unit.

According to the present invention, even in a case where the line width correction processing and the tailing suppression processing are provided by a parallel configuration (a configuration having a smaller circuit size by a shared circuit), the tailing suppression processing can be performed by a culling pattern depending on a change in the edge region due to the line width correction processing. As a result, the tailing suppression effect can be suppressed from being reduced.

Further features of the present invention will become apparent from the following description of exemplary embodiments (with reference to the attached drawings).

BRIEF DESCRIPTION OF THE DRAWINGS

FIG. 20A and FIG. 20B illustrate the result of the setting to the line width correction processing unit in Embodiment 1;

FIG. 22A to FIG. 22C illustrate a tailing suppression processing specification set in the tailing suppression processing unit of Embodiment 1;

DESCRIPTION OF THE EMBODIMENTS

The following section will describe an embodiment for carrying out the present invention with reference to the drawings.

A case will be described as an embodiment of the present invention in which the invention is applied to a laser beam printer. However, the invention is not limited to this. The invention also can be applied to, within a scope not deviating from the intention thereof, an arbitrary printer or an electronic photograph-type image processing apparatus such as a facsimile. A case will be described in which the invention is applied to a white black printer. However, the invention also can be applied to a color printer.

Embodiment 1

<Entire System Configuration>

Figure 1:
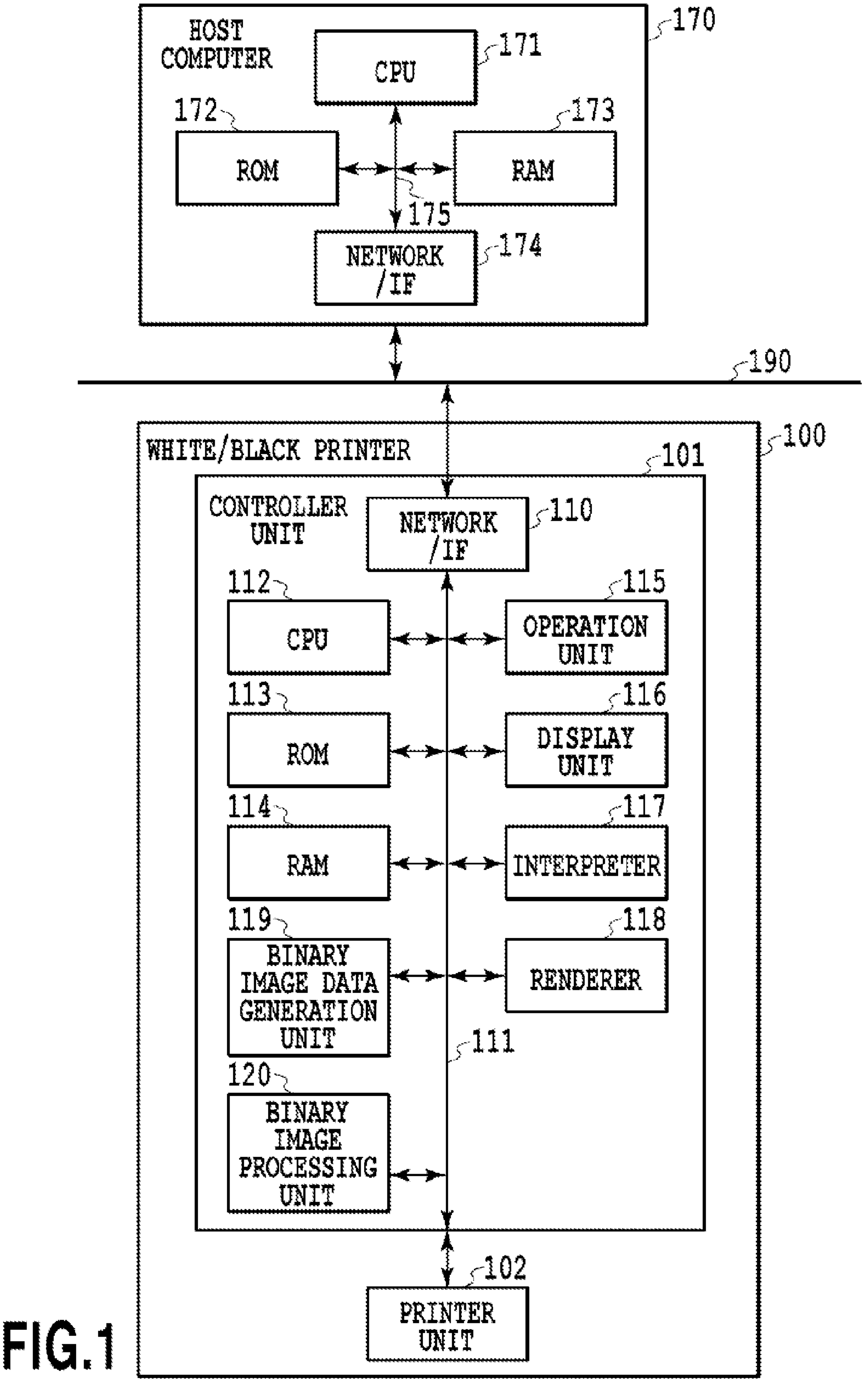
FIG. 1 is a system configuration diagram.
Figure 2A:
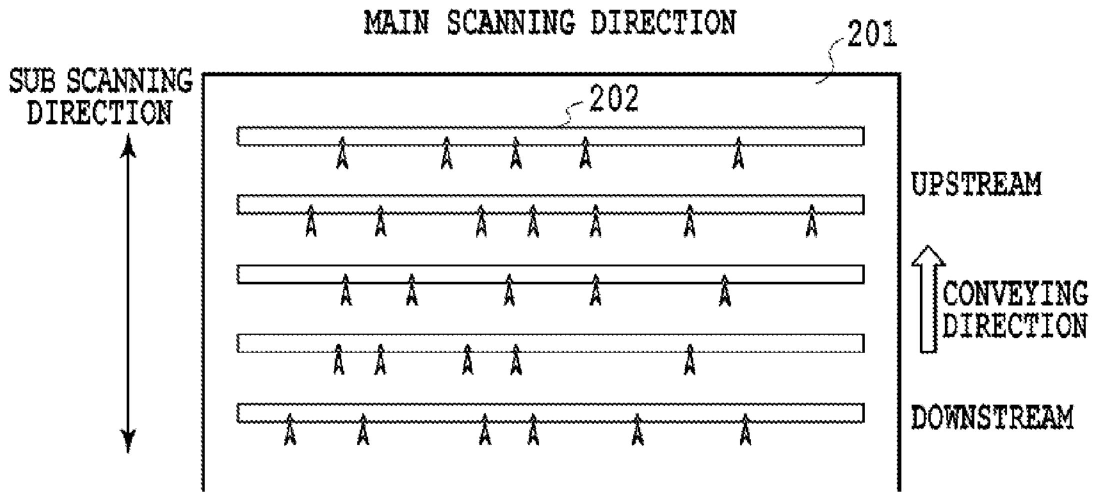
FIG. 2A and FIG. 2B illustrate a tailing phenomenon.
Figure 2B:
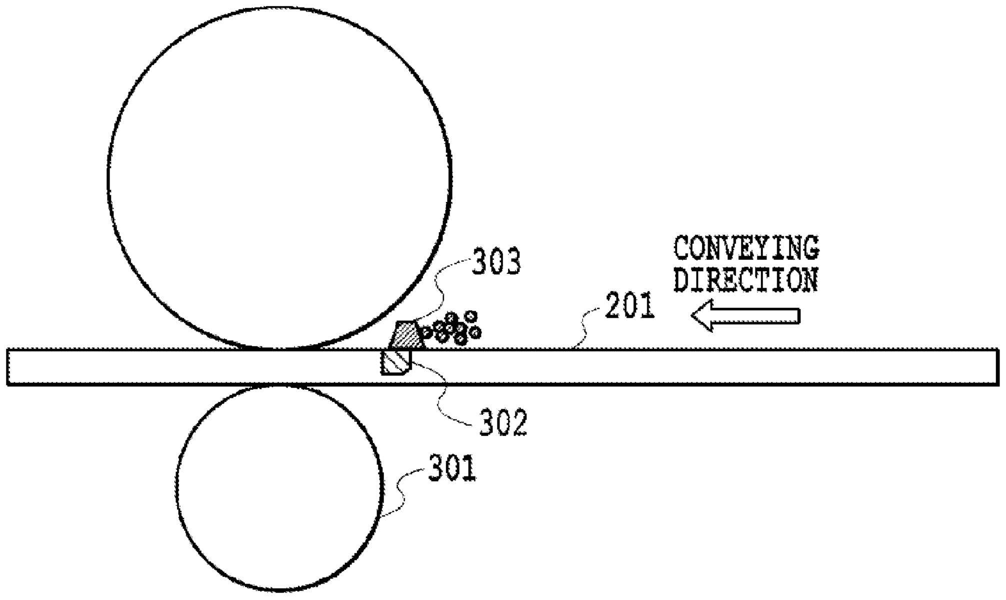

FIG. 1 illustrates the system configuration of Embodiment 1. In Embodiment 1, a host computer 170 is connected to a white black printer 100 via the external network 190. A drawing command sent from the host computer is received by the white black printer. Then, the white black printer performs a processing to convert the command to pixel data that can be outputted and prints the data on a paper surface.

The host computer 170 is configured so that a CPU 171, a ROM 172, a RAM 173, and a network I/F 174 are connected via a bus 175.

The RAM 173 loads program data stored in the ROM 172 to temporally store the program data. The CPU 171 executes applications stored in the RAM 173. By using these applications, a page layout document, a word processor document, or a graphic document for example can be prepared. The digital document data prepared by these applications is subjected to the execution by the CPU 171 of a printer driver stored in the RAM 173, thereby generating a drawing command based on the digital document. The drawing command generated by the printer driver generally includes a language called a printer description language (PDL) used to prepare page image data. The drawing command generally includes drawing instructions for data such as characters, graphics, or images.

Then, the CPU 171 sends the generated drawing command via the network I/F 174 to the white black printer 100 through the external network 190.

<Configuration of White Black Printer>

The white black printer 100 is composed of: a controller unit 101; and a printer unit 102. As shown in FIG. 1, the controller unit 101 is configured so that various modules such as the CPU 112 are connected via a data bus 111. The RAM 114 loads program data stored in the ROM 113 to temporarily store the data. The CPU 112 sends, by executing the program loaded in the RAM 114, instructions to various modules to cause the printer unit 102 to operate. The RAM 114 also temporarily stores data generated in a case where instructions are executed by the respective modules. The network I/F 110 is an interface module to the external network 190. Based on a communication protocol such as Ethernet®, the network I/F 110 performs a bidirectional data communication such as the reception of drawing commands via the network 190 from other devices and the transmission of the device information of the white black printer (e.g., jam information or paper size information).

A display unit 116 displays a user interface (UI) screen that displays an instruction to a user or the status of the printer unit 102. An operation unit 115 is an interface for receiving an input from a user.

An interpreter 117 interprets a drawing command received via the network I/F 110 to generate intermediate language data. A renderer 118 generates a raster image based on the generated intermediate language data. A binary image data generation unit 119 subjects the generated raster image to an image processing (e.g., a color convert processing, a $\gamma$ correction processing by a lookup table, or a pseudo half tone processing) to generate binary image data. In Embodiment 1, the subsequent processing will be described while paying attention on the binary image data generated by the binary image data generation unit 119.

A binary image processing unit 120 performs an image processing (which will be described later) on the binary image data inputted from the binary image data generation unit 119 to convert the data to an image data format that can be outputted from the printer unit 102.

The printer unit 102 connected to the controller unit 101 is a printer that forms, based on the image data that is converted by the binary image processing unit 120 and that can be outputted, an image on a paper surface by using toner.

<Binary Image Processing Unit>

Figure 3:
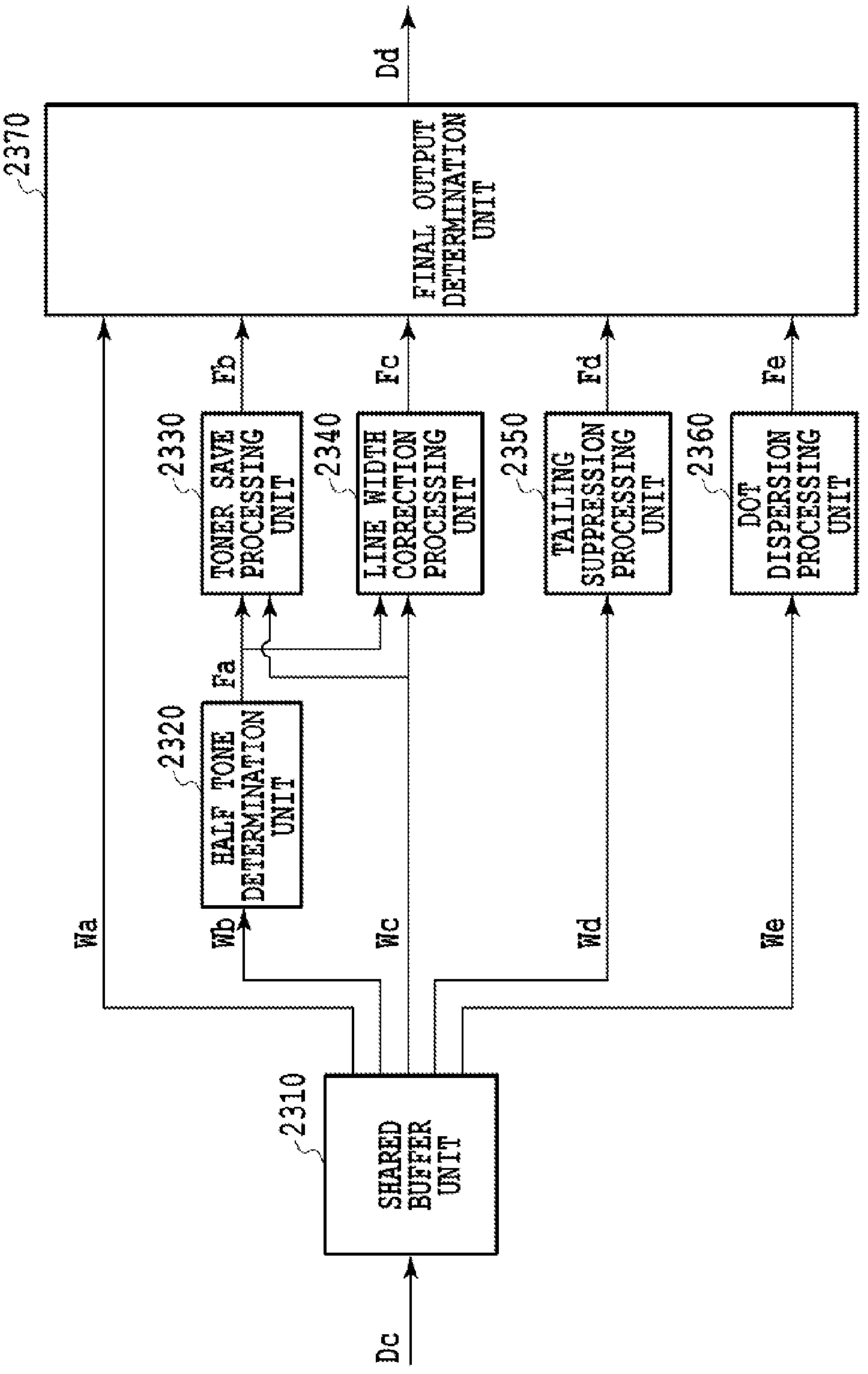
FIG. 3 illustrates an example of the configuration of a binary image processing unit.

FIG. 3 is a block diagram illustrating the details of the binary image processing unit 120. The binary image processing unit 120 receives the binary image data generated by the binary image data generation unit 119 to convert the data to an image format that can be received by the printer unit 102 to subsequently send the converted data to the printer unit 102. The following description will be made based on an assumption that the pixel data binarized by the above-described binary image data generation unit 119 is configured so that 1 represents a black pixel and 0 represents a white pixel. The binary image processing unit 120 subjects the respective pixels to the respective processings in parallel to obtain the respective processing results and then finally determines, based on the respective processing results, the output pixel values of the pixels. Hereinafter, a pixel being processed by the binary image processing unit 120 is called a target pixel and the position thereof is called a target pixel position.

As shown in FIG. 3, the binary image processing unit 120 includes: a shared buffer unit 2310; a half tone determination unit 2320; a toner save processing unit 2330; a line width correction processing unit 2340; a tailing suppression processing unit 2350; a dot dispersion processing unit 2360; and a final output determination unit 2370.

The shared buffer unit 2310 is provided in a former stage of each image processing unit. The shared buffer unit 2310 retains the input pixel data corresponding to a plurality of lines in an accumulated manner. Based on the accumulated input pixel data, the shared buffer unit 2310 outputs the pixel groups Wa to We required for the respective subsequent image processing units.

The half tone determination unit 2320 refers to the pixel group Wb having a predetermined window size (e.g., 11×11) around the target pixel as a center to determine whether the target pixel is a pixel of a half tone region or not. The half tone determination result Fa is outputted to the subsequent toner save processing unit 2330 and line width correction processing unit 2340. In a case where the target pixel is not the one of a half tone region and is an edge pixel, then no toner save processing is performed. In a case where the target pixel is the one of a half tone region, no line width correction processing is performed.

The toner save processing unit 2330 mainly subjects an image object (also may be simply referred as an object) to a pixel culling processing for reducing a toner consumption amount. The toner save processing unit 2330 determines, based on the culling pattern of the toner save processing and the target pixel position, whether the target pixel is a culling target or not. The toner save processing unit 2330 also refers to the pixel group We having a predetermined window size (e.g., 3×3) around the target pixel to determine whether or not the target pixel is an edge pixel provided at a neighboring boundary between a black pixel and a white pixel. In a case where the target pixel is a culling target and has an input pixel value of 1 (black pixel) and is not determined as an edge pixel, then the determination result Fb is set to ON (which means that a culling process for saving toner is to be executed) and the pixel value is converted to 0 (white pixel) and the converted value is outputted. In a case where the target pixel is determined as a culling target and has an input pixel value of 1 (black pixel) and is determined as an edge pixel and the half tone determination result Fa shows that the target pixel is the one of a half tone region, then the determination result Fb is set to ON with regard to the pixel and the pixel value is converted to 0 and the converted value is outputted.

The line width correction processing unit 2340 mainly performs a line width correction processing to highlight a fine line or an object such as a small graphic. The line width correction processing also may be called as a plump processing. The line width correction processing unit 2340 refers to the pixel group We having a predetermined window size (e.g., 3×3) around the target pixel to determine whether the target pixel is an edge neighboring pixel or not. In a case where the target pixel is determined as an edge neighboring pixel and the half tone determination result Fa shows that the target pixel is not a pixel of a half tone region and the inputted pixel value is 0 (white pixel), then the determination result Fc for the target pixel shows that the line width correction processing execution is ON and the pixel value is converted to 1 (black pixel) and the converted value is outputted.

The tailing suppression processing unit 2350 performs a culling process for tailing suppression. The tailing suppression processing unit 2350 refers to the pixel group Wd having the predetermined window size (e.g., 9×9) around a target pixel as a center to determine whether the target pixel should be culled for tailing suppression or not. First, the tailing suppression processing unit 2350 detects a line image (line image region) from the image group Wd. Depending on the line width of the detected line image, the type of the culling pattern for the tailing suppression processing and the position of the culling processing line in the line image are determined. Next, the tailing suppression processing unit 2350 determines, based on the culling pattern for the tailing suppression processing and the target pixel position, whether the target pixel is a culling target or not. In a case where the target pixel is determined as a culling target, then whether the pixel is included in the culling processing line or not is further determined. In a case where it is determined that the input pixel value is 1 (black pixel) and is a culling target and is included in the culling processing line, then the determination result Fd with regard to the target pixel is set to ON (a culling execution for tailing suppression) and the input pixel value is converted to 0 (white pixel) and the converted value is outputted.

In order to avoid an unattractive appearance the dot dispersion processing unit 2360 reduces and disperses the white dots having a specific pattern in the image while maintaining the density. The dot dispersion processing unit 2360 refers to the pixel group We having a predetermined window size (e.g., 27×27) around the target pixel as a center to determine whether or not the white dots of the current target pixel should be reduced and whether or not white dots should be given to the target pixel position to thereby output the determination result Fe. In a case where it is determined that white dots should be reduced, the input pixel value of the target pixel is converted to 1 (black pixel) and the converted value is outputted. In a case where it is determined that white dots should be given to the target pixel, the input pixel value of the target pixel is converted to 0 (white pixel) and the converted value is outputted. In a case where neither of the above determinations is made, the input pixel value of the target pixel is directly outputted.

The final output determination unit 2370 determines the final pixel value of the target pixel based on the input pixel value of the target pixel and the processing results of the respective processing units.

<Shared Buffer Unit>

Next, with reference to FIGS. 4A and 4B, the shared buffer unit 2310 will be described in detail. First, the binarized pixel data Dc is inputted to the shared buffer unit 2310. The shared buffer unit sequentially accumulates the pixel data Dc in buffer. As a result, the shared buffer unit accumulates the pixel data corresponding to a plurality of lines.

Figure 4B:
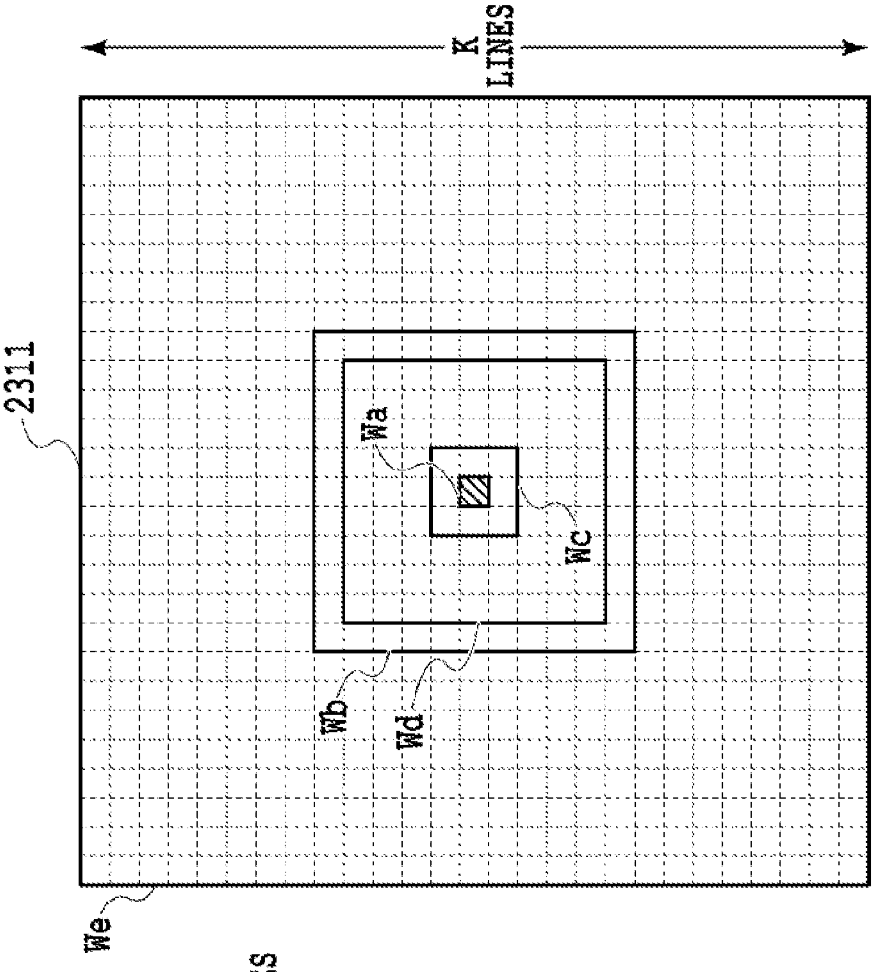
FIG. 4A and FIG. 4B illustrate an example of the data accumulation in a shared buffer unit and an output pixel group.
Figure 4A:
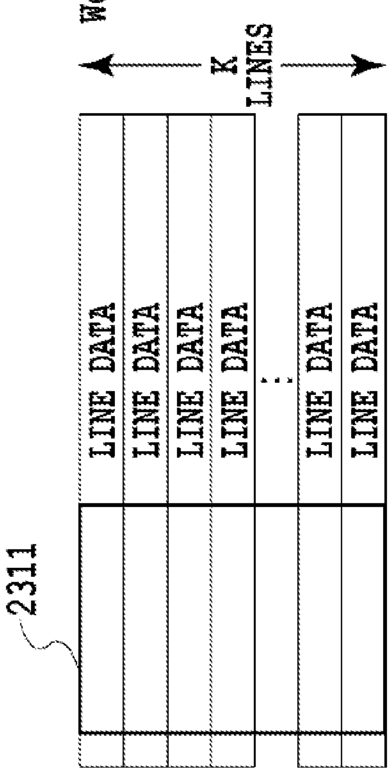

FIG. 4A illustrates the pixel data corresponding to K lines (K is an integer) accumulated in the shared buffer unit 2310. In a case where the accumulated pixel data reaches an amount corresponding to the K lines, the shared buffer unit 2310 overwrites the pixels in a ring-like manner from the top in an accumulated manner. As a result, the shared buffer unit 2310 always retains the accumulated pixel data corresponding to the K lines starting from the line having the currently-accumulated input pixel data Dc. From this accumulated and retained pixel data group, the shared buffer unit 2310 collectively outputs the pixel data group required for the respective subsequent image processing unit. Thus, the accumulation amount (accumulated line number K) in the shared buffer unit 2310 matches the line width of the pixel group that is desired to be collectively referred to by the subsequent image processing unit.

FIG. 4B illustrates an example of an output pixel of the shared buffer unit 2310. An output pixel group 2311 shows a part of the data corresponding to K lines shown in FIG. 4A.

The pixel Wa is a target pixel and is directly inputted to the subsequent final output determination unit 2370.

The pixel group Wb is a pixel group outputted to the subsequent half tone determination unit 2320. The pixel group Wb is exemplarily shown as a 11×11 pixel group. Specifically, the half tone determination unit 2320 collectively refers to the 11×11 pixel group for the half tone determination of the target pixel position.

The pixel group Wc is a pixel group outputted to the subsequent toner save processing unit 2330 and line width correction processing unit 2340. The pixel group Wc is exemplarily shown as a 3×3 pixel group. Specifically, the toner save processing unit 2330 and the line width correction processing unit 2340 collectively refer to the 3×3 pixel group in order to obtain the toner save processing result for the target pixel position and the line width correction processing result.

The pixel group Wd is a pixel group outputted to the subsequent tailing suppression processing unit 2350. The pixel group Wd is exemplarily shown as a 9×9 pixel group. Specifically, the tailing suppression processing unit 2350 collectively refers to the 9×9 pixel group in order to obtain the tailing suppression processing result of the target pixel position.

The pixel group We is a pixel group outputted to the subsequent dot dispersion processing unit 2360. The pixel group We is exemplarily shown as a 27×27 pixel group. Specifically, the dot dispersion processing unit 2360 collectively refers to the 27×27 pixel group in order to obtain the dot dispersion processing result of the target pixel position.

Thus, 27, which is the maximum line number among the output pixel group from Wa to We, is the line number to be accumulated in the shared buffer unit 2310. Thus, K=27 is established in this embodiment.

By having the shared buffer unit 2310 as described above, no need is required to individually configure a plurality of buffer units to generate the pixel groups Wa, Wb, Wc, Wd, and We. Thus, the existence of the shared buffer unit 2310 as in this embodiment can achieve a smaller circuit size and a lower cost when compared with a case where a plurality of buffer units are configured.

<Half Tone Determination Processing>

Figure 5:
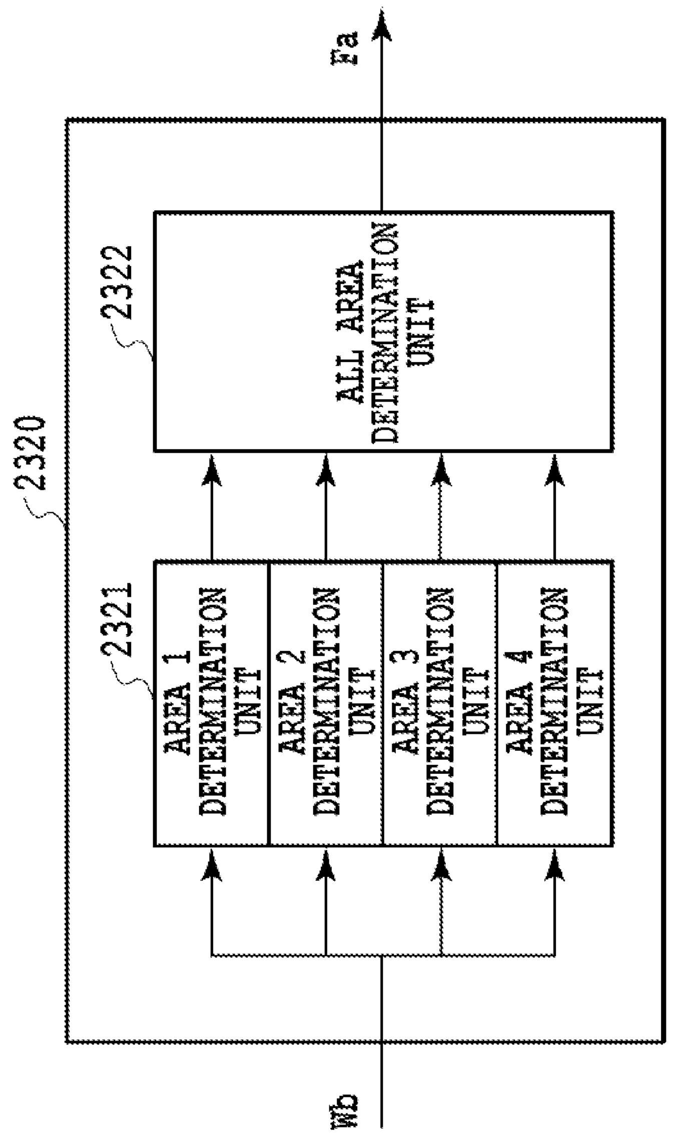
FIG. 5 is a block diagram illustrating an example of the configuration of a half tone determination unit.

Next, with reference to FIG. 5, the half tone determination unit 2320 will be described in detail. The half tone determination unit 2320 receives the 11×11 pixel group Wb from the shared buffer unit 2310. In the half tone determination unit 2320, firstly, the pixel group Wb is input to four area determination units 2321. The four area determination units are: an area1 determination unit, an area1 determination unit, an area3 determination unit, and an area4 determination unit. The area determination unit 2321 determines whether a specific area is entirely white or not.

Figure 6A:
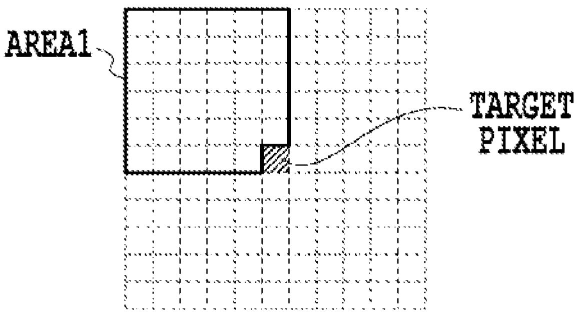
FIG. 6A to FIG. 6D illustrate an example of the Area determination in the half tone determination unit.
Figure 6B:
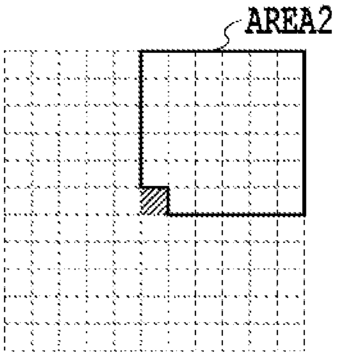
Figure 6C:
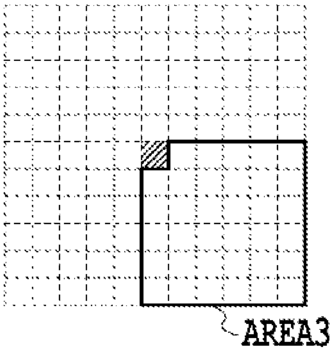
Figure 6D:
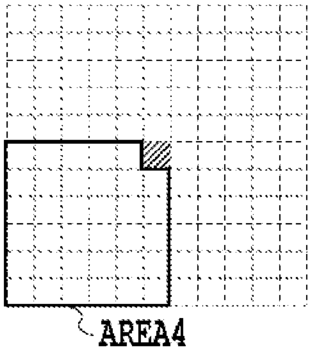

FIGS. 6A to 6D illustrate the processing by the area determination unit 2321. The respective 11×11 matrices shown in FIGS. 6A to 6D represent the pixel group Wb. The shaded parts show the target pixel. In FIG. 6A, the Area1 thereamong is shown by a thick line. Similarly, the Area1 in FIG. 6B, the Area3 in FIG. 6C, and the Area4 in FIG. 6D are shown by a thick line. The area determination unit 2321 determines whether these areas are respectively entirely white or not. An area that is entirely white means that all pixels in the area have a value of 0.

Then, an all area determination unit 2322 generates a final half tone determination result Fa based on the determination by the area determination unit 2321 that the four areas are entirely white. Specifically, if any one of the four areas is determined to be entirely white, then a half tone is not determined. If no one of the four areas is determined to be entirely white, then a half tone is determined. If it is determined that the respective four areas are entirely black (all pixel values have a value of 1), a half tone is similarly determined in this embodiment. Specifically, the half tone of this embodiment does not necessarily match the half tone of the area gradation.

In this embodiment, the one half tone determination result Fa outputted from the half tone determination unit 2320 is commonly inputted to the subsequent toner save processing unit 2330 and line width correction processing unit 2340. In this manner, the half tone determination result shared by the toner save processing and the line width correction processing can reduce the circuit size. However, if necessary, another configuration also may be used in which the toner save processing unit 2330 and the line width correction processing unit 2340 may respectively change the definitions of the determinations areas 1 to 4. Then, the respective determination result may be separately inputted to the toner save processing unit 2330 and the line width correction processing unit 2340.

<Toner Save Processing>

Figure 7:
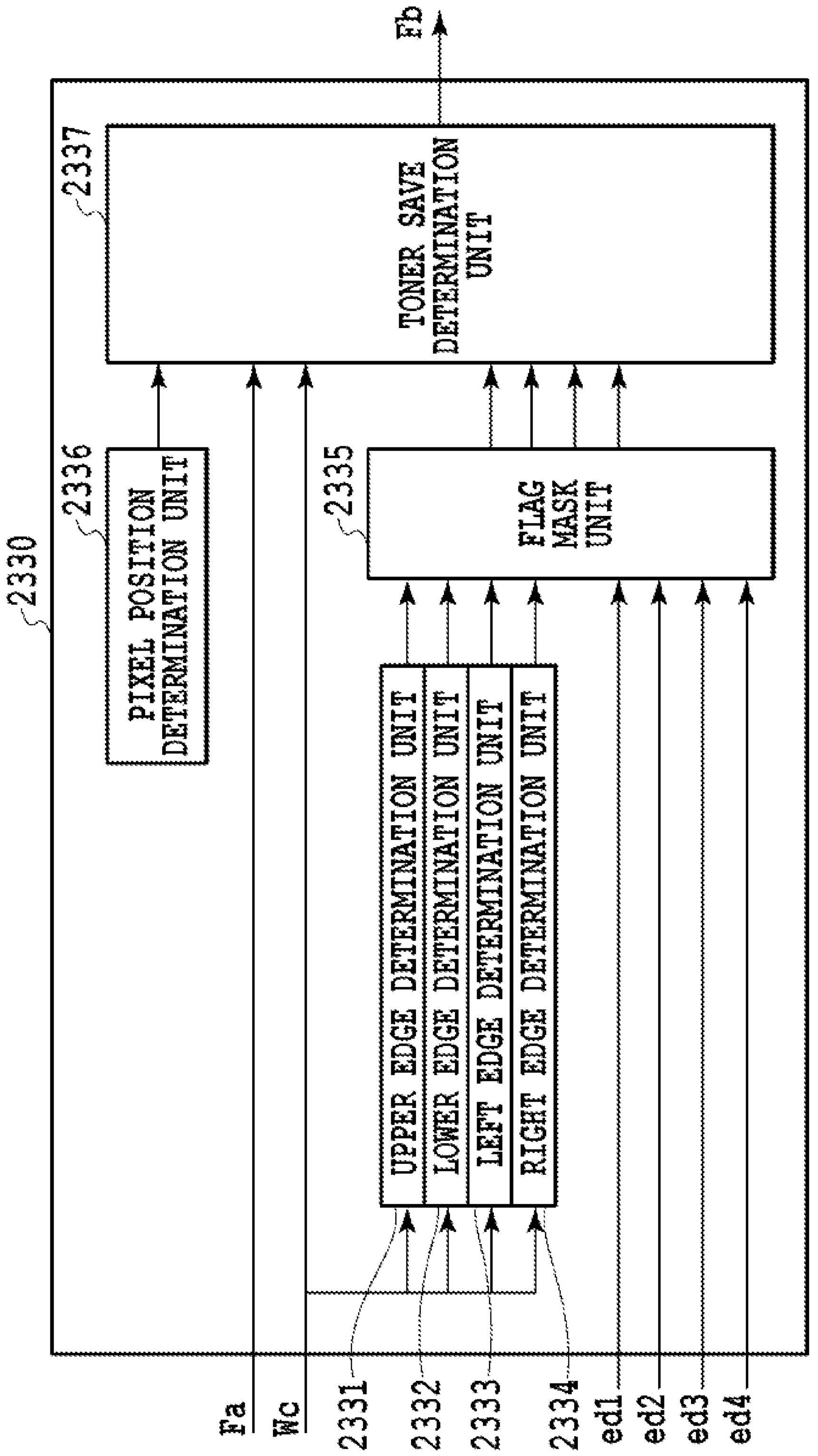
FIG. 7 illustrates an example of the configuration of a toner save processing unit.

Next, with reference to FIG. 7, the toner save processing unit 2330 will be described in detail. The toner save processing unit mainly performs the pixel culling processing to reduce the toner consumption amount. The toner save processing unit 2330 receives the 3×3 pixel group Wc having a target pixel as a center from the shared buffer unit 2310. In the toner save processing unit 2330, firstly, the pixel group Wc is input to four edge determination units 2331 to 2334. The four edge determination units 2331 to 2334 executes the edge determination processing in four directions. The edge determination processing is a processing to determine whether the target pixel is an edge pixel provided at a neighboring boundary between a black pixel and a white pixel.

Figure 8E:
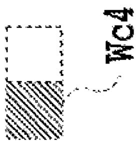
FIG. 8A to FIG. 8E illustrate an example of an edge determination processing in the toner save processing unit.
Figure 8D:
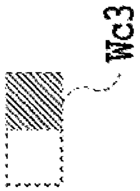
Figure 8C:
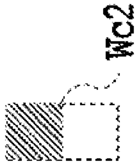
Figure 8B:
Figure 8A:
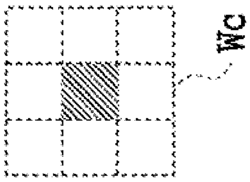

FIGS. 8A to 8E illustrate the processings by the edge determination units 2331 to 2334. In FIG. 8A, the 3×3 matrix shows the pixel group Wc inputted to the edge determination units 2331 to 2334. The shaded part shows a target pixel. In FIG. 8B, Wc1 shows the target pixel therein and a pixel on an upper region. In reference to Wc1, it is determined whether or not the target pixel in the pixel group Wc is a black pixel and the upper region pixel is a white pixel. This determination is executed by an upper edge determination unit 2331. In a case where the target pixel is a black pixel and the upper region pixel is a white pixel, the upper edge determination unit 2331 determines that the target pixel is an upper edge pixel to output the determination result the subsequent the flag mask unit 2335. Similarly, in FIG. 8C, Wc2 shows target pixel and the pixel of the lower region thereof. In FIG. 8D, Wc3 shows the target pixel and a pixel of the left region thereof. In FIG. 8E, Wc4 shows the target pixel and a pixel for the right region thereof. These pixels are referred to respectively to perform an edge determination. The edge determination with regard to the lower direction, the left direction, and the right direction is executed by a lower edge determination unit 2332, a left edge determination unit 2333, and a right edge determination unit 2334 to determine whether or not the target pixel is a black pixel and the reference region pixel is a white pixel.

Next, the flag mask unit 2335 performs a processing to mask the edge determination result of the above-described upper, lower, left and right directions. By the mask processing, even if an edge is detected, the determination result showing that no edge is detected can be outputted to the subsequent unit.

Specifically, the flag mask unit 2335 refers to the edge detection setting signals ed1 to ed4 inputted by the CPU 112 based on the setting described below to determine whether or not to mask the respective edge determination results. The reference marks ed1 to ed4 show the upper, lower, left and right edge detection settings, respectively. In a case where ed1 is set to OFF for example, the flag mask unit 2335 masks the edge determination signal outputted from the upper edge determination unit 2331 to send the determination result to a subsequent unit. Specifically, even if the upper edge determination unit 2331 detects an upper edge, the determination result showing that no upper edge is detected is sent to a subsequent unit. On the contrary, in a case where ed1 is set to ON and the upper edge determination unit 2331 detects an upper edge, then the determination result is directly outputted to a subsequent unit. A similar processing is performed on the lower edge for ed2, on the left edge for ed3, and on the right edge for ed4. By doing this, the flag mask unit 2335 outputs, to the subsequent toner save determination unit 2337, the edge determination result (edge detection information) in the direction along which ed1 to ed4 are ON.

The pixel position determination unit 2336 generates a signal showing the position of the currently-processed target pixel (target pixel position information) to output the signal to the toner save determination unit 2337. For example, in a case where a culling pattern is a checkered pattern, this output signal is a signal showing whether the target pixel is positioned at an odd number line or an even number line in the sub scanning direction within the processing page or is positioned at an odd number pixel or an even number pixel in the main scanning direction. This signal is used for the subsequent toner save determination processing.

Next, the toner save determination unit 2337 determines whether the current target pixel should be culled for the purpose of reducing the toner consumption amount (or a black pixel should be substituted with a white pixel). Then, the toner save determination unit 2337 outputs the determination result Fb to a subsequent unit. This determination is executed by referring to the half tone determination result Fa, the target pixel data showing a part of the 3×3 pixel group Wc, the upper, lower, left and right edge determination results outputted from the flag mask unit 2335, and the target pixel position information from the pixel position determination unit 2336.

The toner save determination unit 2337 firstly determines, by a logical operation, whether or not the target pixel is a culling target of a toner save processing based on the target pixel position information from the pixel position determination unit 2336 and the culling pattern for the toner save processing (a toner save pattern). As an example, the toner save determination unit 2337 refers to the target pixel position information to determine, in a case where the target pixel position is at an odd number line, the odd number pixel as a culling target and determine, in a case where the target pixel position is at an even number line, the even number pixel as a culling target. As a result, the pixels determined as a culling target are arranged to form a checkered pattern with regard to the entire image. In a case where a target pixel is not determined as a culling target, then the determination result Fb is set to OFF (a culling for toner saving is not executed) and thus the inputted target pixel value is directly outputted.

Next, in a case where the pixel is determined as a culling target, then whether or not the pixel is in an edge region is determined. The toner save determination unit 2337 refers to the masked upper, lower, left and right edge determination results inputted from the flag mask unit 2335 to determine whether the target pixel is in an edge region or not. For example, in a case where any one of the masked upper, lower, left and right edge determination results shows that the target pixel is in an edge region, then the target pixel is determined as an edge region. In a case where any one of the masked upper, lower, left and right edge determination results shows that the target pixel is in not an edge region, then the target pixel is determined as a no-edge region other than an edge region. In a case where the pixel determined as a culling target and determined as the one in a no-edge region has an input pixel value of 1 (black pixel), then the determination result Fb is set to ON (culling execution for toner saving) and the input pixel value is converted to 0 (white pixel) and the converted value is outputted.

Then, it is determined whether or not the pixel determined as a culling target and determined as the one in an edge region is the one of a half tone. Upon receiving the half tone determination result Fa, in a case where the target pixel is determined as the one of a half tone and the input pixel value is 1 (black pixel), then the determination result Fb of the pixel is set to ON (culling execution for toner saving) and the input pixel value is converted to 0 (white pixel) and the converted value is outputted. In a case where the half tone determination result Fa shows that the target pixel is not determined as the one of a half tone, then the determination result Fb is set to OFF (no culling execution for toner saving) the input pixel value is directly outputted, even if the pixel is determined as the one of an edge region.

Specifically, in a case where the target pixel is determined as a culling target and has an input pixel value of 1 (black pixel) and is not determined as an edge pixel or in a case where the target pixel is determined as an edge pixel but the half tone determination result Fa shows that the pixel is the one of a half tone region, then it is determined that the pixel should be culled. With regard to the pixel, the determination result Fb is set to ON (culling execution for toner saving) and the pixel value is converted to 0 (white pixel) and the converted value is outputted. In a case where pixel determined as the culling target is a black pixel with regard to the target pixel but the half tone determination result Fa shows that the pixel is not the one of a half tone region, then it is determined that the pixel should not be culled. Then, with regard to the pixel, the determination result Fb is set to OFF (no execution of culling for toner saving), the pixel value having 1 (black pixel) is directly outputted. This consequently reduces the toner consumption amount while suppressing a situation where the quality of an edge is deteriorated because an edge of a region other than a half tone region (e.g., characters) is undesirably culled. The above section has described a case in which the culling pattern was a checkered pattern. However, another culling pattern also may be used for toner save processing.

Figure 9A:
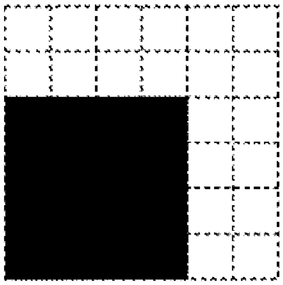
FIG. 9A and FIG. 9B illustrate an example of an input/output image of the toner save processing unit.
Figure 9B:
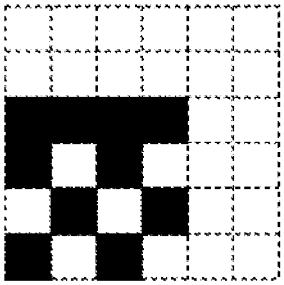

FIGS. 9A and 9B illustrate an example of the input/output image of the toner save processing unit 2330. As an example of the setting, a case is shown in which the edge detection setting is set to ON (only ed1 is ON) with regard to only the upper edge. FIG. 9A illustrates the input pixel data to the toner save processing unit 2330. As shown in FIG. 9B, with regard to this input pixel data, only the upper edge region is not subjected to a culling processing for toner saving and the other image regions are subjected to a culling processing having a checkered pattern for toner saving and the resultant image is outputted to a subsequent unit.

<Line Width Correction Processing Unit>

Figure 10:
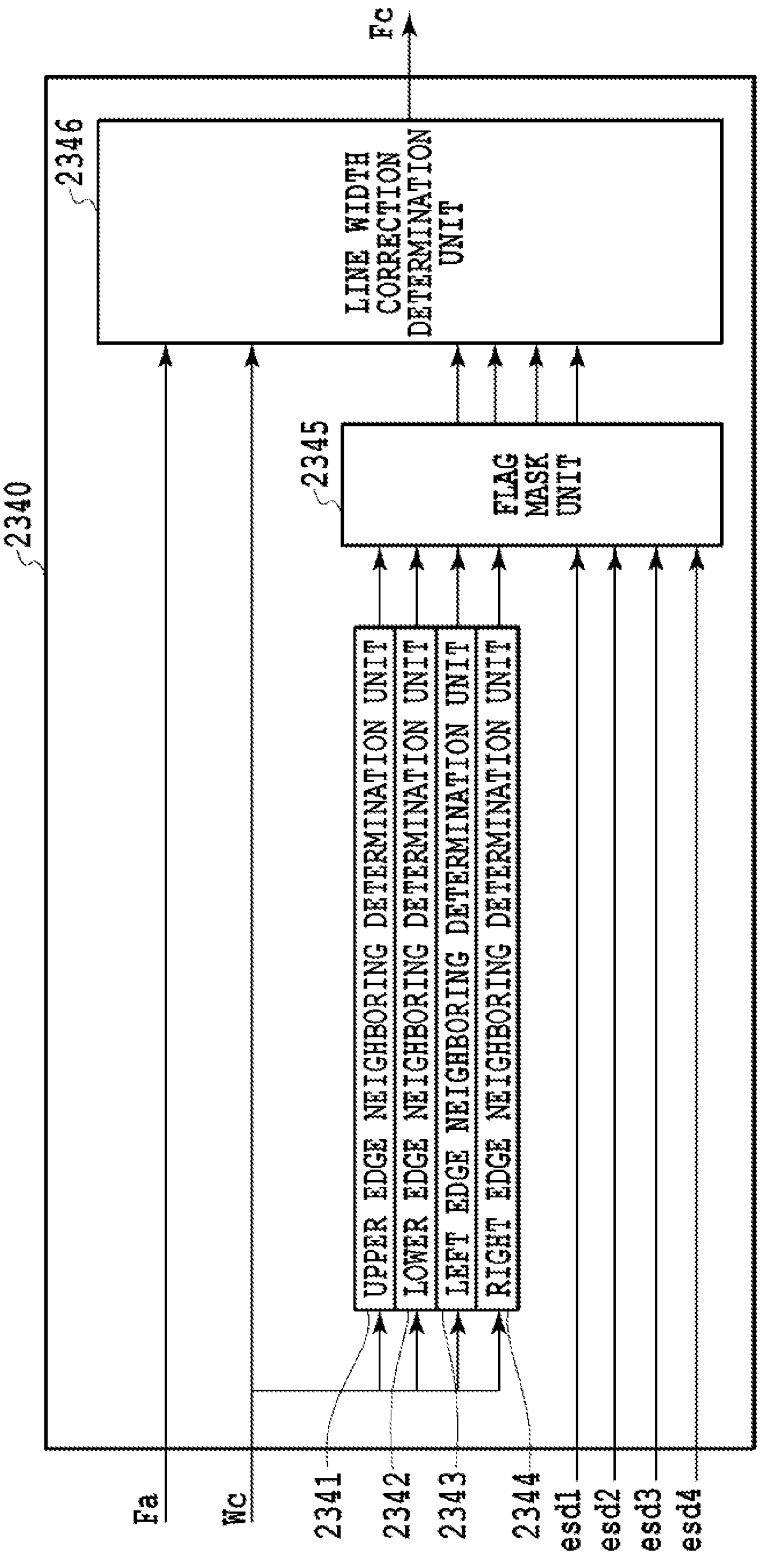
FIG. 10 illustrates an example of the configuration of the line width correction processing unit.

Next, with reference to FIG. 10, the line width correction processing unit 2340 will be described in detail. The line width correction processing unit 2340 mainly performs a line width correction processing to highlight a fine line or an object such as a small graphic. The line width correction processing unit 2340 receives, from the shared buffer unit 2310, the 3×3 pixel group Wc having a target pixel as a center. In the line width correction processing unit 2340, firstly, the pixel group Wc is input to the four edge neighboring determination units 2341 to 2344.

The four edge neighboring determination units 2341 to 2344 execute an edge neighboring determination processing in four directions, respectively. The edge neighboring determination processing is a processing to determine whether or not the target pixel is a white pixel which is provided at a neighboring boundary between a black pixel and a white pixel.

Figure 11A:
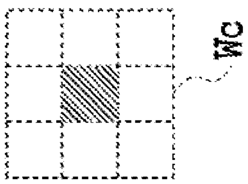
FIG. 11A to FIG. 11E illustrate an example of the edge neighboring determination processing in the line width correction processing unit.

FIGS. 11A to 11E illustrate the processing by the edge neighboring determination units 2341 to 2344. The 3×3 matrix in FIG. 11A shows the pixel group Wc inputted to the edge neighboring determination units 2341 to 2344. The shaded part shows a target pixel.

Figure 11B:

In FIG. 11B, Wc5 shows the target pixel in the pixel group Wc and the pixels in the upper and lower regions. In reference to Wc5, it is determined whether or not the target pixel and the upper region pixel in the pixel group Wc are a white pixel and the lower region pixel is a black pixel. This is executed by the upper edge neighboring determination unit 2341. In a case where the target pixel and the upper region pixel are a white pixel and the lower region pixel is a black pixel, then the upper edge neighboring determination unit 2341 determines that the target pixel is an upper edge neighboring pixel and outputs the determination result to the subsequent flag mask unit 2345.

Figure 11C:
Figure 11D:
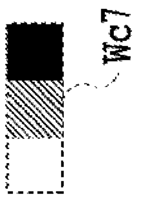
Figure 11E:
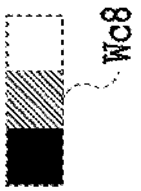

Similarly, with regard to Wc6 of FIG. 11C, the lower edge neighboring determination unit 2342 refers to the target pixel and the pixels of the upper and lower regions to determine whether or not the target pixel and the lower region pixel are a white pixel and the upper region pixel is a black pixel to determine whether the target pixel is a lower edge neighboring pixel. In FIG. 11D, with regard to Wc7, the left edge neighboring determination unit 2343 refers to the target pixel and the pixels of the left and right regions to determine whether or not the target pixel and the left region pixel are a white pixel and the right region pixel is a black pixel to thereby determine whether or not the target pixel is a left edge neighboring pixel. Similarly, in FIG. 11E, with regard to Wc8, the right edge neighboring determination unit 2344 refers to the target pixel and the pixels of the left and right regions to determine whether or not the target pixel and the right region pixel are a white pixel and whether or not the left region pixel is a black pixel to thereby determine whether or not the target pixel is a right edge neighboring pixel.

Next, the flag mask unit 2345 performs the above-described processing to mask the edge neighboring determination result in the upper, lower, left and right directions. By the mask processing provides, even if an edge neighboring position is detected, the determination result showing that no edge neighboring position is detected can be outputted to a subsequent unit. Specifically, the flag mask unit 2345 refers to the edge neighboring detection setting signals esd1 to esd4 inputted by the CPU 112 based on the line width correction setting described later to determine the processing. The reference marks esd1 to esd4 show the upper, lower, left and right edge neighboring detection settings, respectively.

For example, in a case where esd1 is set to OFF, the flag mask unit 2345 masks the edge neighboring determination signal outputted from the upper edge neighboring determination unit 2341 and outputs the determination result to a subsequent unit. Specifically, even if the upper edge neighboring determination unit 2341 detects the upper edge neighboring position, the subsequent unit receives the determination result showing that no upper edge neighboring position is detected. In a case where esd1 is set to ON on the contrary, the subsequent unit directly receives the determination result showing that the upper edge neighboring position is detected by the upper edge neighboring determination unit 2341.

A similar processing is performed on the determination result of the lower edge neighboring position with regard to esd2, on the determination result of the left edge neighboring position with regard to esd3, and on the determination result of the right edge neighboring position with regard to esd4. By doing this, the flag mask unit 2345 outputs, to the subsequent line width correction determination unit 2346, the edge neighboring determination result (edge neighboring position information) in the directions along which esd1 to esd4 are ON.

Next, the line width correction determination unit 2346 determines whether or not to plump the current target pixel for the line width correction (or to substitute a white pixel with a black pixel) to output the determination result Fc to a subsequent unit. This determination is executed by referring to the half tone determination result Fa, the target pixel data constituting a part of Wc, and the upper, lower, left and right edge neighboring determination results.

Specifically, the line width correction determination unit 2346 refers to the upper, lower, left and right edge neighboring determination results inputted from the flag mask unit 2345 to determine whether or not the target pixel is at an edge neighboring position. For example, in a case where any of the masked upper, lower, left and right edge neighboring determination results determines that the target pixel is at an edge neighboring position, then the target pixel is determined as the one in the edge neighboring region. In a case where any of the masked upper, lower, left and right edge neighboring determination results determines that the target pixel is not at an edge neighboring position, then the target pixel is determined as the one not in the edge neighboring region.

In a case where the target pixel is determined as not the one in the edge neighboring region, then the determination result Fc is set to OFF (no execution of the line width correction processing) and the input pixel value is directly outputted. In a case where the target pixel is determined as an edge neighboring region, then whether or not the pixel is the one of a half tone is determined. If the half tone determination result Fa shows that the target pixel is determined as the one of a half tone, even if the pixel is determined as the one in the edge neighboring region, the determination result Fc is set to OFF (no execution of the line width correction processing) and the input pixel value is directly outputted. In a case where the half tone determination result Fa determines that the target pixel is not the one of a half tone, the determination result Fc for the pixel is set to ON (line width correction processing execution) and the input pixel value is converted to 1 (black pixel) and the converted value is outputted.

Specifically, in a case where the target pixel is determined as an edge neighboring pixel and the half tone determination result Fa shows that the pixel is not the one in a half tone region and the inputted pixel value is 0 (white pixel), then the determination result Fc for the target pixel outputs a pixel value different from the input pixel value. In the case other than the above case, then the determination result Fc for the target pixel outputs a signal having the same pixel value as the input pixel value. This consequently improves the quality of a fine line or an object such as a small graphic while suppressing the deteriorated quality of the edge due to the highlighted edge of a halftone dot of the half tone region.

Figure 12A:
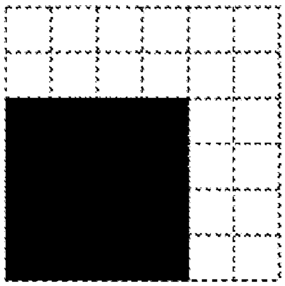
FIG. 12A and FIG. 12B illustrate an example of the input/output image of the line width correction processing unit.
Figure 12B:
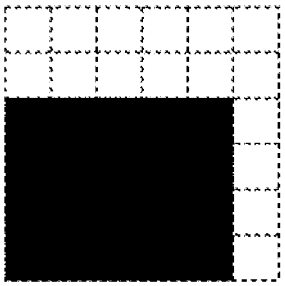

FIGS. 12A and 12B illustrate an example of the input/output image of the line width correction processing unit 2340. As an example of the setting, a case is shown in which the edge neighboring detection setting is set to ON (only esd4 is set to ON) with regard to the right edge only. FIG. 12A shows the input pixel data to the line width correction processing unit 2340. With regard to this input pixel data, as shown in FIG. 12B, only the right edge is subjected to the line width correction processing and the input image with regard to the other image regions is directly outputted to the subsequent unit.

<Tailing Suppression Processing Unit>

Figure 13:
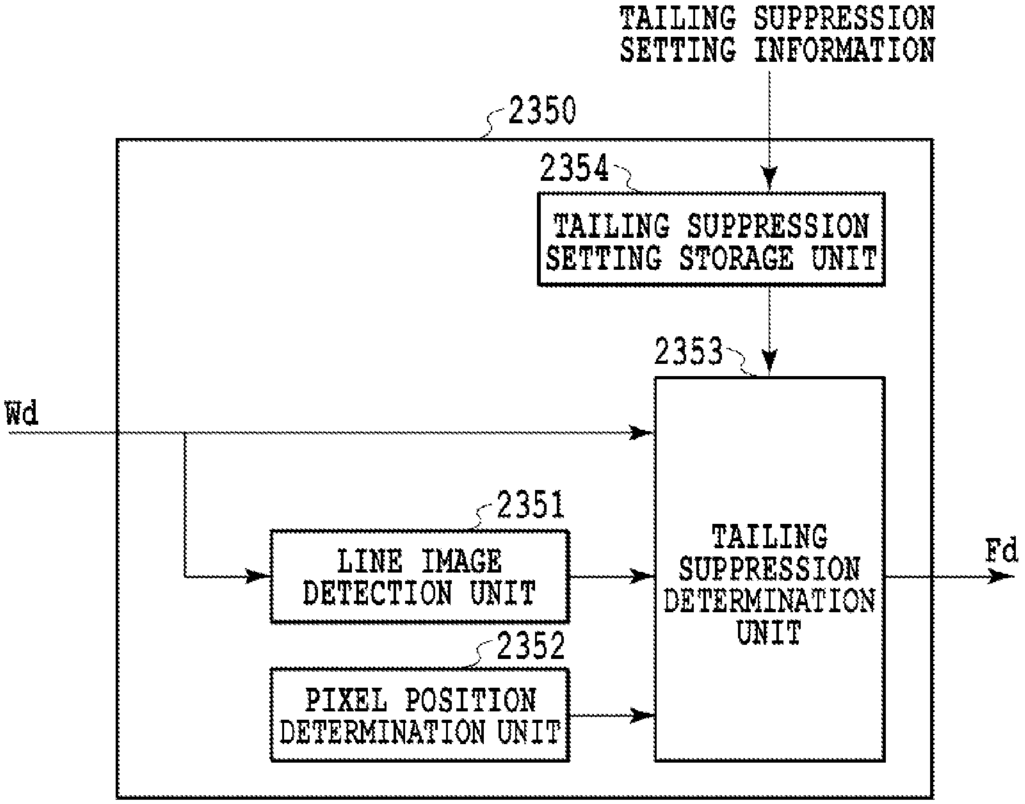
FIG. 13 illustrates an example of the configuration of the tailing suppression processing unit.

Next, with reference to FIG. 13, the tailing suppression processing unit 2350 will be described in detail. It is noted that the tailing suppression processing unit 2350 executes the culling processing based on an algorithm different from that of the toner save processing unit 2330. The tailing suppression processing unit 2350 performs the culling for tailing suppression.

The tailing suppression processing unit 2350 receives the 9×9 pixel group Wd from the shared buffer unit 2310. In the tailing suppression processing unit 2350, firstly, the pixel group Wd is input to the line image detection unit 2351.

The line image detection unit 2351 determines whether or not the respective lines of the inputted pixel group Wd are a black line based on the number or ratio of black pixels in the lines. In this embodiment, if all of the pixels in the lines are black pixels, then the lines are determined as black lines. The term "line" herein means a row of pixels having a 1 pixel width extending in the main scanning direction. The term "line image" means an image of a plurality of lines in which black lines are arranged to be adjacent to one another in the sub scanning direction. The line image detection unit 2351 detects a line image including the target pixel based on the black line determination result to determine the line image information such as a line image width to output the information to the tailing suppression determination unit 2353. In this embodiment, the line image information further includes a relative position of the line image in the pixel group Wd.

The pixel position determination unit 2352 generates the signal (target pixel position information) showing the position of the currently-processed target pixel and outputs the signal to the tailing suppression determination unit 2353. For example, in a case where the tailing suppression processing also uses a culling pattern of a checkered pattern, this output signal functions as a signal showing that the target pixel is in an odd number line or in an even number line within the processing page in the sub scanning direction or showing that the target pixel is in an odd number line or in an even number line in the main scanning direction. This signal is used for the subsequent culling processing.

Next, the tailing suppression determination unit 2353 determines whether or not the current target pixel should be culled for the above-described tailing suppression to output the determination result Fd to a subsequent unit. This determination is executed by referring to the target pixel data constituting a part of Wd, the line image detection result by the line image detection unit 2351, the target pixel position information by the pixel position determination unit 2352, and the tailing suppression setting information stored in the tailing suppression setting storage unit 2354.

The tailing suppression setting information stored in the tailing suppression setting storage unit 2354 is information that should be referred to by the tailing suppression determination unit 2353 and that defines the details of the tailing suppression processing (method). This information will be hereinafter referred to as a tailing suppression processing specification. By the setting of the tailing suppression processing specification, the details of the tailing suppression processing applied to a line image having a predetermined line width are determined depending on the level of the line width correction as described later. If the setting of the tailing suppression processing specification changes, the details of the applied tailing suppression processing also changes, even if the line image has the same line width. This tailing suppression processing specification includes the to-be-applied culling pattern type (Pattern) and the position of the culling processing line in the line image that are specified while being associated with the width of the black line. In this embodiment, the position of the culling processing line includes the position (EdgeLine) and the culling width (ApplyLine) from the lower end of the edge of the line image to which the culling pattern is applied.

First, the tailing suppression determination unit 2353 determines, with regard to the width of the detected line image, the type of the to-be-applied culling pattern and the position of the culling processing line to the line image. Then, the tailing suppression determination unit 2353 determines whether or not the target pixel is a culling target based on the determined culling pattern for the tailing suppression processing and the target pixel position information received from the pixel position determination unit. Next, with regard to the pixel determined as a culling target, whether or not the pixel is included in the culling processing line is determined. This determination can be performed by referring to the relative position of the line image in the pixel group Wd received from the line image detection unit 2351. In a case where it is determined that the input pixel value is 1 (black pixel) and the pixel is a culling target and is included in the culling processing line, with regard to the target pixel, the determination result Fd is set to ON (execution of culling for tailing suppression) and the input pixel value is converted to 0 (white pixel) and the convert value is outputted. In a case where it is not determined that the input pixel value is 1 (black pixel) and the pixel is a culling target and is included in the culling processing line, with regard to the target pixel (i.e., in a case that the input pixel value is 0 (white pixel), the pixel is not a culling target, or the pixel is not included in the culling processing line), then the determination result Fd with regard to the pixel is set to OFF (no execution of culling for tailing suppression) and the input pixel value is directly outputted.

Figure 14A:
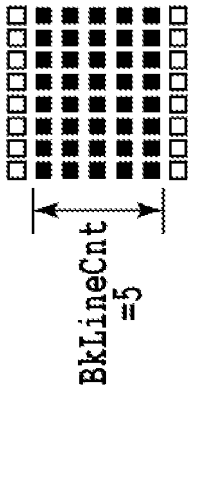
FIG. 14A and FIG. 14B illustrate an example of the input/output image of the tailing suppression processing unit.
Figure 14B:
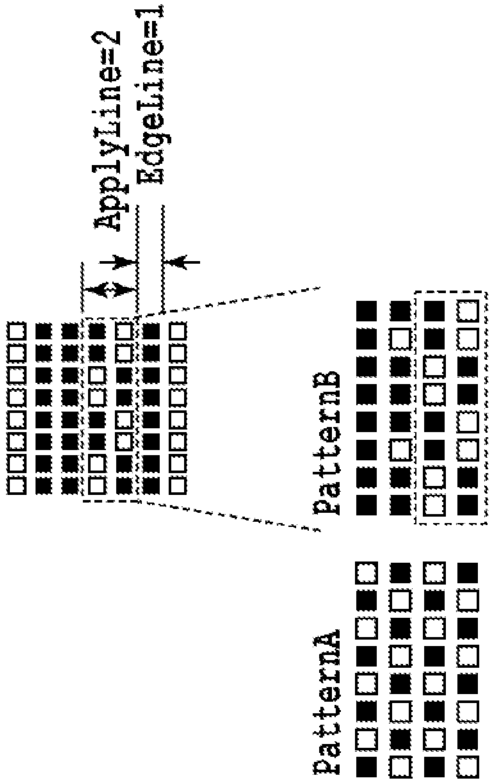

FIGS. 14A and 14B illustrate an example of the input/output image of the tailing suppression processing unit 2350.

As an example, a case is shown in which the line image has the black line width corresponding to 5 lines. FIG. 14A illustrates the input pixel data to the tailing suppression processing unit 2350. This input pixel data is detected as a 5 line image. Based on the culling pattern type to be applied to the 5 line image and the tailing suppression processing specification such as the culling line position, the tailing suppression processing is executed. As a result, as shown in FIG. 14B, the detected line image (5 line image) is subjected to a culling processing for tailing suppression (scatter prevention) based on a desired culling pattern (Pattern B) and the resultant image is outputted to a subsequent unit.

The culling processing shown in FIG. 14B uses the tailing suppression processing specification in the case where the black line width corresponds to 5 lines (BkLineCnt=5). Specifically, such a tailing suppression processing specification is used that uses the position (EdgeLine=1) of the line at which a pattern from the lower end of the edge is culled and the line width (ApplyLine=2) by which the culling pattern is applied. As a culling pattern to be applied, PatternB is set and ApplyLine is 2 lines. Thus, 2 lines at the lower end of PatternB are used for the culling processing for tailing suppression. The tailing suppression processing specification for performing the culling processing is a default tailing suppression processing specification (which will be described later) shown in FIG. 22A.

The ROM 113 stores therein the tailing suppression processing specification including the culling pattern type (Pattern) and the culling line position to a detected black line width for example and a plurality of culling patterns registered as Pattern of the tailing suppression processing specification. In the tailing suppression processing setting flow described later, the CPU 112 stores, from among a plurality of tailing suppression processing specifications stored in the ROM 113, the appropriate one as the tailing suppression setting information into the tailing suppression setting storage unit 2354.

The pattern size is not limited to the size shown in FIG. 14B and should be changed also depending on the resolution of the input/output image for example. The white black pattern registered as Pattern of the tailing suppression processing specification does not always have to be a regular pattern. Another pattern also may be used by which the culling amount is reduced in a direction away from the edge.

<Dot Dispersion Processing Unit>

Figure 15:
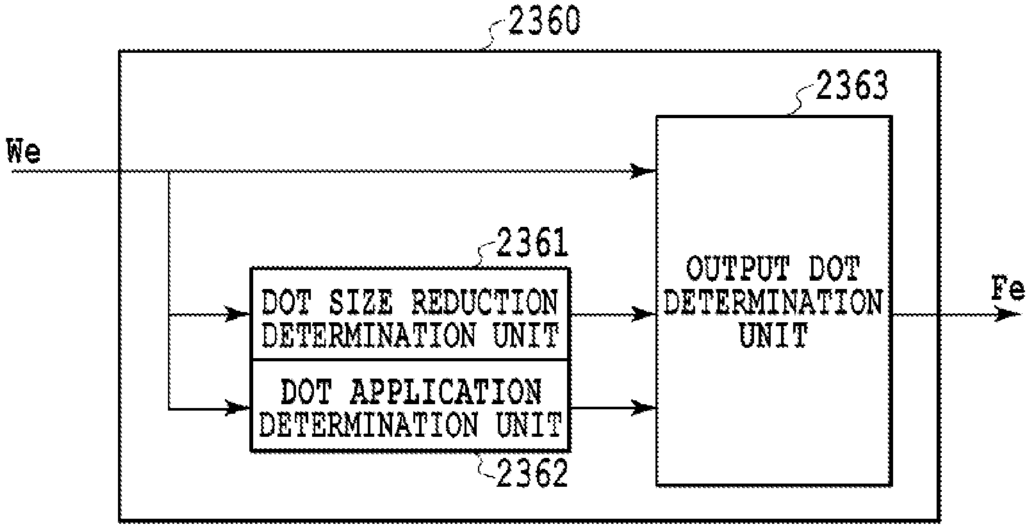
FIG. 15 illustrates an example of the configuration of a dot dispersion processing unit.

Next, with reference to FIG. 15, the dot dispersion processing unit 2360 will be described in detail. The dot dispersion processing unit 2360 performs the processing for the purpose of preventing the situation in which white dots printed on a print medium are excessively large depending on the performance of the printer unit 102 to result in an image having an unattractive appearance. Specifically, white dots in a specific pattern within the image are size-reduced and dispersed while maintaining the density. The dot dispersion processing unit 2360 receives the 27×27 pixel group We from the shared buffer unit 2310. In the dot dispersion processing unit 2360, firstly, the pixel group We is input to the dot size reduction determination unit 2361 and the dot application determination unit 2362.

In a case where the target pixel position has a white pixel and the 27×27 pixel group We includes white pixels existing in a point-symmetric manner in four diagonal directions having the target pixel position as a center, then the dot size reduction determination unit 2361 outputs, to a subsequent output dot determination unit 2363, a signal for executing the dot size reduction.

In a case where the target pixel position has a black pixel and the 27×27 pixel group We includes white pixels existing in a point-symmetric manner in the four upper, lower, left and right directions having the target pixel position as a center, the dot application determination unit 2362 outputs, to the subsequent output dot determination unit 2363, a signal for executing dot application.

Next, the output dot determination unit 2363 determines whether or not the white dots of the current target pixel should be size-reduced and whether or not white dots should be applied to the target pixel position to output the determination result Fe to the subsequent final output determination unit 2370. This determination is executed by referring to the target pixel data constituting a part of the We, the dot size reduction determination result, and the dot application determination result. With regard to the target pixel subjected to the dot size reduction determination, the input pixel value is converted to 1 (black pixel) and the converted value is outputted. With regard to the target pixel subjected to the dot application determination, the input pixel value is converted to 0 (white pixel) and the converted value is outputted. If the target pixel does not apply to none of the above determinations, then the input pixel value is directly outputted.

Figure 16A:
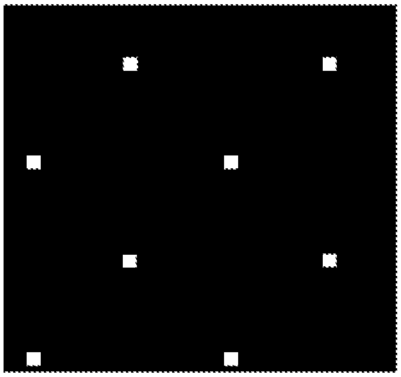
FIG. 16A and FIG. 16B illustrate an example of the input/output image of the dot dispersion processing unit.
Figure 16B:
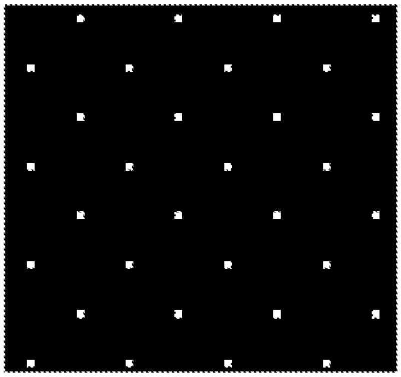

FIGS. 16A and 16B show an example of the input/output image of the dot dispersion processing unit 2360. FIG. 16A illustrates the input pixel data to the dot dispersion processing unit 2360. As shown in FIG. 16B, this input pixel data is converted into pixel data for which white dots in the pixel data are size-reduced and dispersed and is outputted to the subsequent final output determination unit 2370.

<Final Output Determination Unit>

The final output determination unit 2370 determines the final output pixel value of the binary image processing unit 120 to output the resultant value as the pixel data Dd to a subsequent unit. The final output determination unit 2370 receives the pixel Wa as a target pixel from the shared buffer unit 2310 and the respective determination results Fb, Fc, Fd, and Fe from the respective image processing units (2330 to 2360). The final output determination unit 2370 receives these inputs and outputs a different pixel value in a case where any one of Fb, Fc, Fd, and Fe has a signal outputting a pixel value different from the pixel Wa. Specifically, in a case where pixel Wa is 0 (white pixel) and any one of Fb, Fc, Fd, and Fe shows an output of 1 (black pixel) on the contrary, 1 (black pixel) is outputted. In a case where the pixel Wa is 1 (black pixel) and any one of Fb, Fc, Fd, and Fe shows an output of 0 (white pixel) on the contrary, 0 (white pixel) is outputted. In a case where the pixel Wa has a pixel value equal to all output pixel values shown by Fb, Fc, Fd, and Fe, the pixel value of the pixel Wa is directly outputted.

The final output determination unit 2370 may be configured to ignore a partial result depending on the setting instead of referring to all results Fb, Fc, Fd, and Fe. For example, in a case where the printer unit 102 not requiring a dot dispersion processing exists in a subsequent stage, the dot dispersion processing result Fe may not be included in the determination. If the respective image processing units arranged in parallel have a different processing delay amount, a delay amount adjustment circuit may be provided in the final output determination unit.

<Print Processing Flow>

Figure 17:
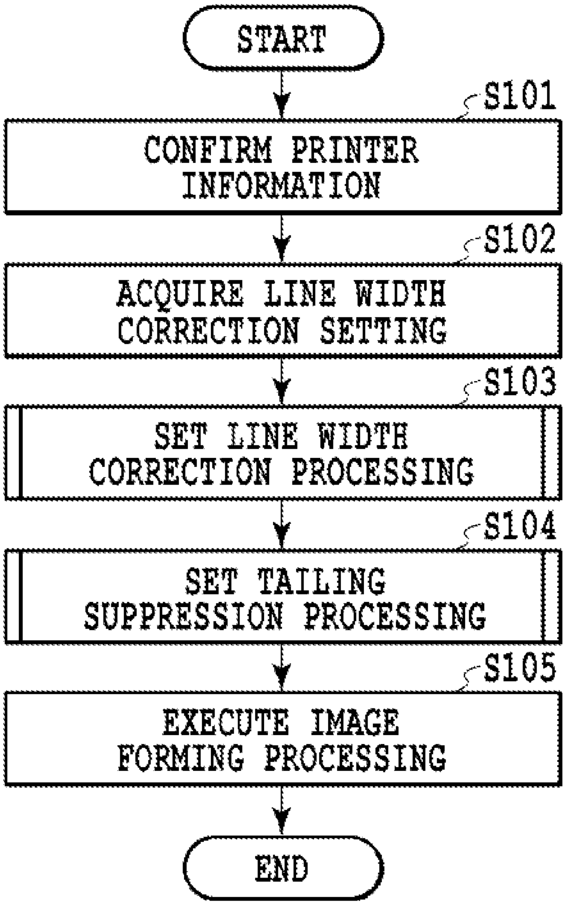
FIG. 17 is a flowchart illustrating a print processing of Embodiment 1.

FIG. 17 is a flowchart illustrating the print processing in the white black printer 100 that is executed by the CPU 112 in the controller unit 101. The program of this operation flowchart is stored in the ROM 113 as a function to be realized by the white/black printer 100. This program is read from the ROM. 113 to the RAM 114 by allowing the CPU 112 to execute a boot program. Then, the program read to the RAM 114 is processed by being executed by the CPU 112.

First, in Step S101, the CPU 112 communicates with the CPU provided in the printer unit 102 to acquire the printer information regarding the image processing for the image forming processing. For example, the CPU 112 acquires such information showing whether or not the tailing suppression processing in the tailing suppression processing unit 2350 and the dot dispersion processing in the dot dispersion processing unit 2360 should be operated. Whether the respective processing units should be operated or not is determined depending on the characteristic of the printer unit 102. For example, in the case of a printer suppressing a fine line from being conspicuous, in order to operate the line width correction, the line width correction processing unit 2340 may be set to ON. In the case of a printer that tends to cause a tailing phenomenon, the tailing suppression processing unit 2350 may be set to ON so that the respective functions can operate. As described above, in a case where the output method of the final output determination unit 2370 is determined, an initial setting is set so that all functions are set to OFF. Depending on a need, a setting may be provided so that the CPU 112 allows the final output determination unit 2370 to refer to any of the results Fb, Fc, Fd, and Fe that realizes the function.

Next, in Step S102, the CPU 112 acquires the information for the line width correction setting. This acquisition may be performed by acquiring the information from information inputted from a user to the operation unit 115 or from the setting information provided on a printer driver installed on the host computer 170. If the setting information must be changed depending on the type or the status of the printer unit 102, the communication with the CPU provided in the printer unit 102 is further performed to acquire information regarding the line width correction setting.

Figure 18:
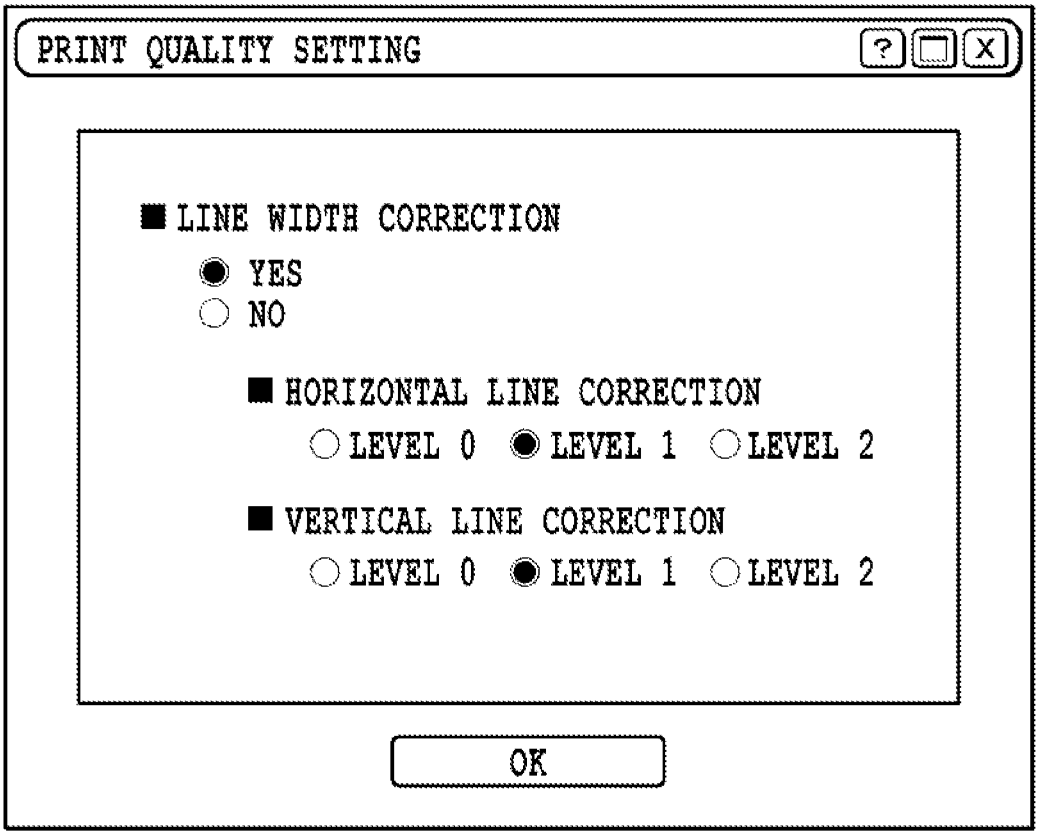
FIG. 18 illustrates an example of the input information acquisition in the operation unit of Embodiment 1.

With reference to FIG. 18, an example will be described with regard to the line width correction setting in the operation unit 115 based on a user instruction. The information regarding the inputted line width correction setting is sent to the CPU 112. FIG. 18 illustrates an example of the setting screen in a liquid crystal operation panel (not shown) on the operation unit 115. The liquid crystal operation panel displays a print quality setting screen for user setting. The user selects whether or not the line width correction processing for plumping the black character width or the line width (object width) should be executed. Specifically, in a case where the line width correction processing is executed, based on the user instruction, a radio button "Yes" in the "line width correction" of FIG. 18 is selected. As a result, a setting is performed to turn ON the line width correction setting. In a case where the line width correction processing is not executed on the other hand, based on the user instruction, a radio button "No" in the "line width correction" of FIG. 18 is selected. As a result, a setting is performed to turn OFF the line width correction setting.

In a case where the line width correction is performed, a horizontal line correction level and a vertical line correction level are selected by the user within a range from 0 to 2 via the operation unit 115. Thus, the horizontal line correction level and the vertical line correction level for the line width correction setting are set. The term "horizontal line correction" means the correction to plump an image in a horizontal direction (main scanning direction) and the level shows the correction strength. The term "vertical line correction" means the correction to plump an image in a vertical direction (sub scanning direction) and the level shows the correction strength. The user sets, via the screen in FIG. 18, whether or not the line width correction is performed or the correction level.

The CPU 112 acquires the details of line width correction setting in the liquid crystal operation panel on the operation unit 115 to thereby acquire the information for the line width correction setting. Although not shown in FIG. 18, the print quality setting screen also may include a "tailing suppression" section by which the user can select whether or not the tailing suppression processing is performed.

Next, in Step S103, the CPU 112 sets, in the line width correction processing unit 2340, the setting information acquired in Step S102. The details of the line width correction processing setting will be described later with reference to FIG. 19.

Next, in Step S104, the CPU 112 sets, in the tailing suppression processing unit 2350, the setting information acquired in Step S101. The details of the tailing suppression processing setting will be described later with reference to FIG. 21.

In Step S105, the CPU 112 execute the image forming processing of the white black printer 100. Specifically, the CPU 112 uses the renderer 118 to develop the print pixel data received from the host computer 170 for example via the external network 190 to provide bitmap data to subsequently output the data to the binary image data generation unit 119. The outputted pixel data is subjected, within the binary image data generation unit 119, to a desired image processing (e.g., a color space processing, a halftone processing, a binary image processing), and is outputted to the binary image processing unit 120. Then, the CPU 112 communicates with the CPU provided in the printer unit 102 to control the printer unit 102 to execute the print processing.

<Line Width Correction Processing Setting Flow>

Figure 19:
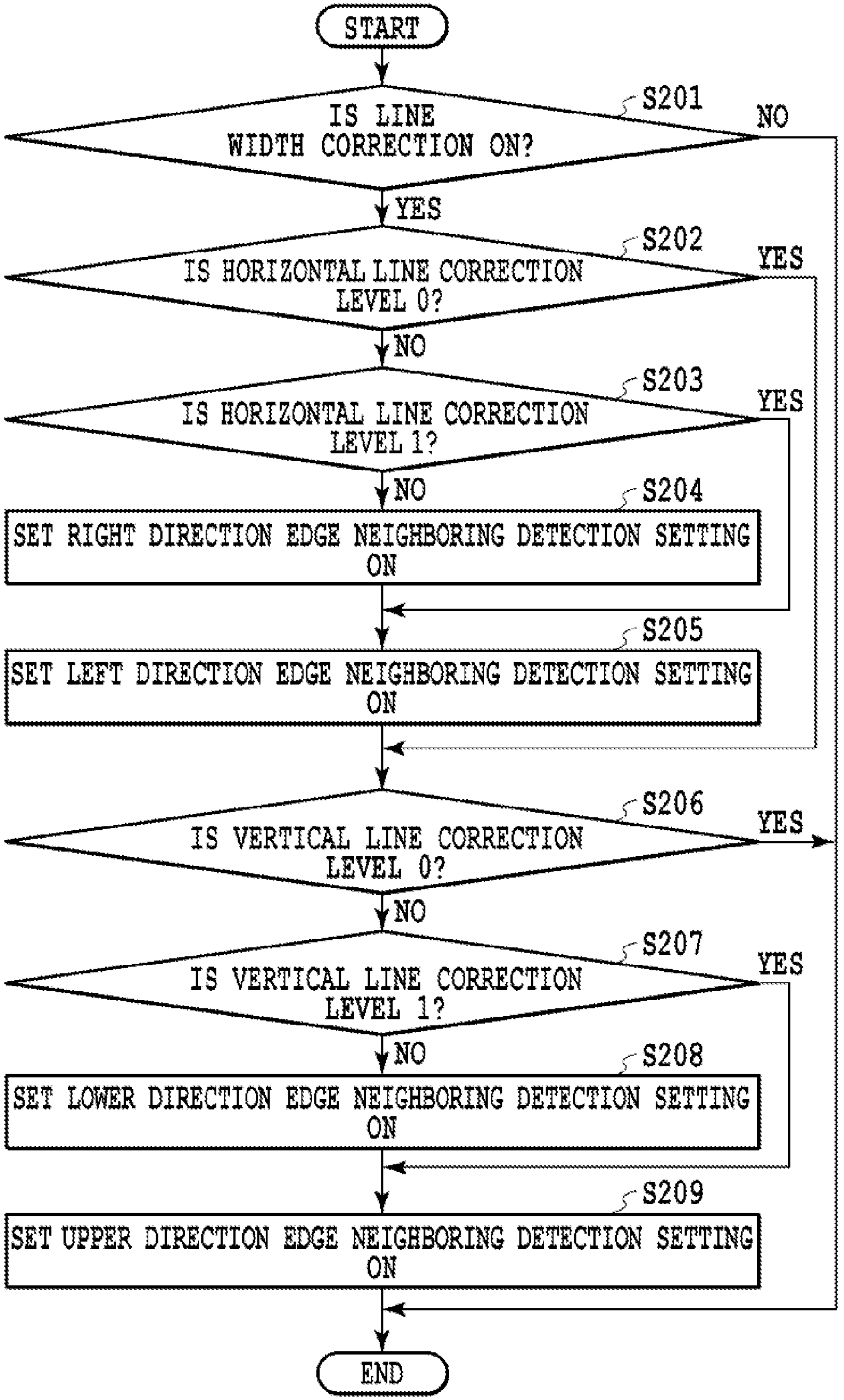
FIG. 19 is a flowchart illustrating a line width correction processing setting of Embodiment 1.

FIG. 19 is a flowchart illustrating the line width correction processing setting executed by the CPU 112 in the controller unit 101 (edge neighboring detection direction setting flowchart). FIG. 19 illustrates the details of Step S103 of FIG. 17. Various pieces of setting information in this flowchart is information acquired in Step S101 from the CPU of the printer unit 102, information inputted by the user to the operation unit 115 in Step S102, or setting information on the driver. The following processing is executed based on the received line width correction setting information. Prior to the execution of this processing, all of the edge neighboring detection setting signals esd1 to esd4 are set to Off that control the edge neighboring detection direction (or that sets the edge neighboring detection direction in a predetermined direction). Then, in Step S201 to Step S209, based on the received information for the line width correction setting, the edge neighboring detection setting signals esd1 to esd4 are set.

First, in Step S201, the CPU 112 determines, based on the received information for the line width correction setting, whether or not the setting of the line width correction is set to ON. In a case where the setting is ON, the processing proceeds to Step S202. In a case where the setting is OFF, the flow is completed.

Next, in Step S202, the determination with regard to the set horizontal line correction level is executed. First, in Step S202, the CPU 112 determines whether or not the horizontal line correction level is 0. In a case where the horizontal line correction level is 0, then the processing proceeds to Step S206. In a case where the horizontal line correction level is not 0, the processing proceeds to Step S203.

Next, in Step S203, whether or not the horizontal line correction level is 1 is determined. In a case where the horizontal line correction level is 1, then the processing proceeds to Step S205. In a case where the horizontal line correction level is not 1, then it is determined that the horizontal line correction level is 2 and the processing proceeds to Step S204.

In Step S204, the CPU 112 performs the ON setting of the right direction edge neighboring detection. Specifically, the CPU 112 sets the esd4 signal inputted to the line width correction processing unit 2340 to ON. As a result, in the line width correction processing unit 2340, the right edge neighboring determination result not masked by the flag mask unit 2345 is inputted to the line width correction determination unit 2346.

In Step S205, the CPU 112 performs the ON setting of the left direction edge neighboring detection. Specifically, the CPU 112 sets the esd3 signal inputted to the line width correction processing unit 2340 to ON. As a result, in the line width correction processing unit 2340, the left edge neighboring determination result not masked by the flag mask unit 2345 is inputted to the line width correction determination unit 2346.

Next, in Step S206, the determination of the set vertical line correction level is executed. First, in Step S206, the CPU 112 determines whether the vertical line correction level is 0 or not. In a case where the vertical line correction level is 0, the flow is completed. In a case where the vertical line correction level is not 0, then the processing proceeds to Step S207.

Next, in Step S207, whether or not the vertical line correction level is 1 is determined. In a case where the vertical line correction level is 1, the processing proceeds to Step S209. In a case where the vertical line correction level is not 1, then it is determined that the vertical line correction level is 2 and the processing proceeds to Step S208.

In Step S208, the CPU 112 performs the ON setting of the lower direction edge neighboring detection. Specifically, the CPU 112 sets the esd2 signal inputted to the line width correction processing unit 2340 to ON. As a result, in the line width correction processing unit 2340, the lower edge neighboring determination result not masked by the flag mask unit 2345 is inputted to the line width correction determination unit 2346.

In Step S209, the CPU 112 performs the ON setting of the upper direction edge neighboring detection. Specifically, the CPU 112 sets the esd1 signal inputted to the line width correction processing unit 2340 to ON. As a result, in the line width correction processing unit 2340, the upper edge neighboring determination result not masked by the flag mask unit 2345 is inputted to the line width correction determination unit 2346.

FIGS. 20A and 20B show the result of the setting to the line width correction processing unit 2340 in the flow of FIG. 19. As shown in FIGS. 20A and 20B, the line width correction processing unit is set with regard to whether or not the line width correction processing is executed. In a case where the line width correction processing is executed, the edge neighboring detection direction depending on the set line width correction level is set in the line width correction processing unit.

<Flow of Tailing Suppression Processing Setting>

Figure 21:
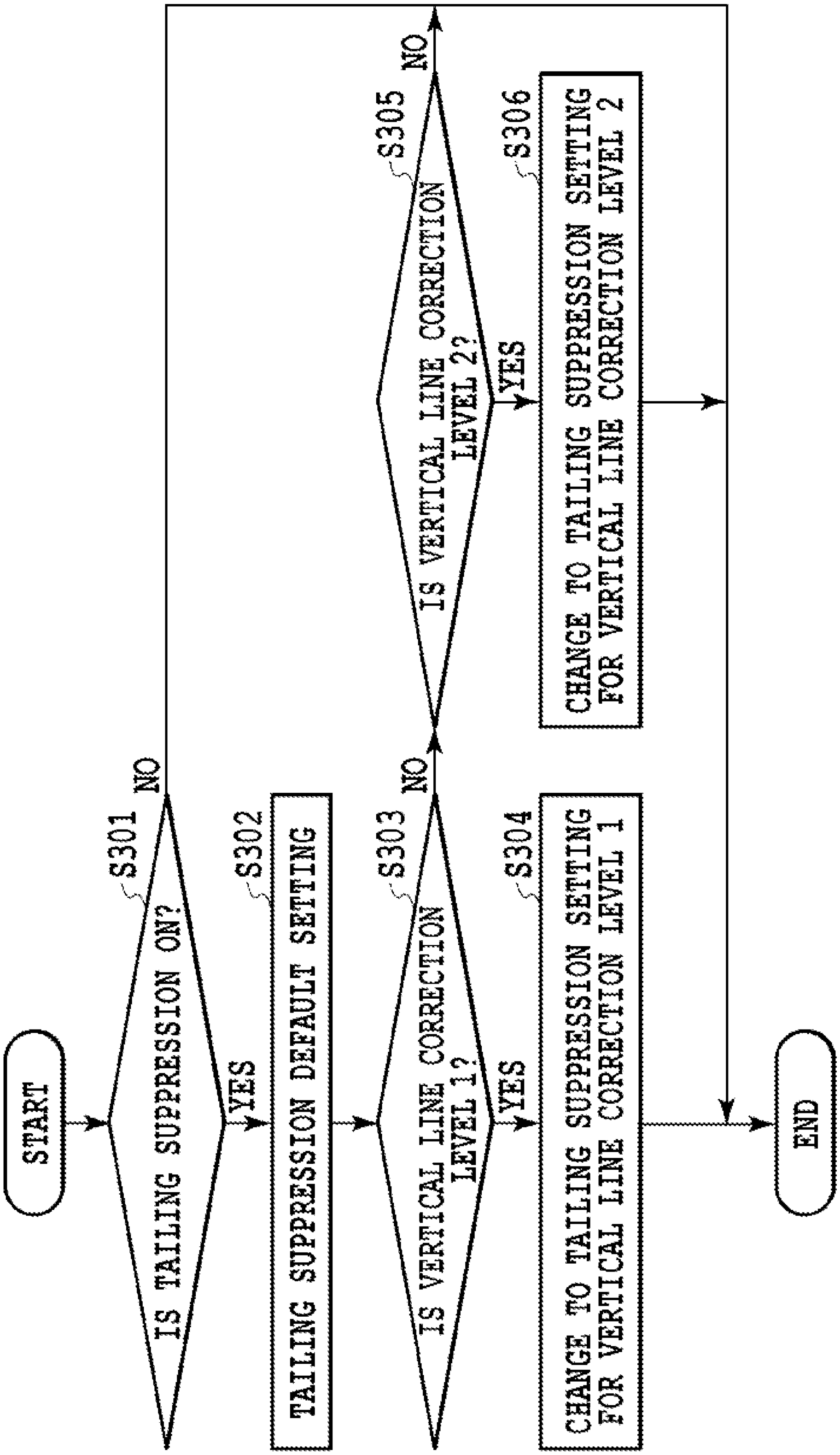
FIG. 21 is a flowchart illustrating the tailing suppression processing setting of Embodiment 1.

FIG. 21 is a flowchart illustrating the tailing suppression processing setting executed by the CPU 112 in the controller unit 101. FIG. 21 shows the specific details of Step S104 in FIG. 17. Various pieces of setting information in this flowchart is information acquired in Step S101 from the CPU of the printer unit 102 or the tailing suppression processing specification stored in the ROM 113.

First, in Step S301, the CPU 112 determines whether the tailing suppression processing is set to ON or not. In a case where the setting is ON, the processing proceeds to Step S302. In a case where the setting is OFF, the flow is completed.

Next, in Step S302, the CPU 112 executes a default tailing suppression processing setting on the tailing suppression processing unit 2350. Specifically, the tailing suppression processing specification as shown in FIG. 22A is set as tailing suppression setting information. In this tailing suppression processing setting, it is determined whether or not the tailing suppression processing is executed. In a case where the tailing suppression processing is executed, the CPU 112 executes the following tailing suppression processing setting on the tailing suppression processing unit 2350.

Specifically, the tailing suppression processing setting is the culling width (APPlyLine) of the pattern to the width (BkLineCnt) of the detected black line, the position (EdgeLine) from the lower end of the edge of the black line to which the culling pattern is applied, and the culling pattern type (Pattern).

The black line width (BkLineCnt) shows the line width to determine whether the culling processing for the tailing suppression can be performed or not. The culling width (APPlyLine) shows a line width for performing a culling processing of the black line determined to be subjected to the culling processing. This culling width is also used to determine, from among the applied culling pattern, which part of the culling pattern should be used. The culling pattern type (Pattern) shows a culling pattern from among a plurality of culling patterns that should be applied to the applicable black line. One tailing suppression setting information is, as shown in FIG. 22A, a set of pieces of information for performing the tailing suppression processing corresponding to a plurality of detection line widths.

The ROM 113 stores therein in advance a plurality of tailing suppression processing specifications that can be set in the tailing suppression processing unit 2350. In a case where Step S302 is executed, the CPU 112 reads, from the ROM 113, to-be-referred-to tailing suppression processing specification. Then, the CPU 112 stores the to-be-referred-to tailing suppression processing specification as tailing suppression setting information in the tailing suppression setting storage unit 2354.

Next, in Step S303, the CPU 112 determines whether the vertical line correction level in the line width correction processing unit is 1 or not. In a case where the vertical line correction level is 1, the processing proceeds to Step S304. In a case where the vertical line correction level is not 1, the processing proceeds to Step S305.

In Step S304, in a case where the vertical line correction level is 1, a change to the tailing suppression setting is executed. In a case where the vertical line correction level is 1, the line width correction processing unit performs a processing to add pixels of one line to the line image in the upper direction. Thus, the tailing suppression processing unit 2350 assumes that the line width after the line width correction processing increases by one line in the upper direction. Thus, the tailing suppression setting information is changed from the default tailing suppression processing specification shown in FIG. 22A to the tailing suppression processing specification shown in FIG. 22B.

For example, as shown in FIG. 22B, the tailing suppression setting information is changed so that ApplyLine or Pattern to a to-be-detected line width (BkLineCnt) is increased by one line. The changed tailing suppression processing specification is stored in the tailing suppression setting storage unit 2354.

In Step S305, the CPU 112 determines whether or not the vertical line correction level in the line width correction setting is 2. In a case where the vertical line correction level is 2, the processing proceeds to Step S306. In a case where the vertical line correction level is not 2, no vertical line correction is executed. Thus, the flow is completed with no change in the default tailing suppression setting.

In a case where the vertical line correction level is 2, a change to the tailing suppression setting is executed in Step S306. In a case where the vertical line correction level is 2, the line width correction processing unit executes a processing to add pixels corresponding to each one line to the line image in the upper and lower directions, respectively. Thus, the tailing suppression processing unit 2350 assumes that the line width after the line width correction processing increases by one line in the upper and lower directions. Thus, the tailing suppression setting information is changed from the default tailing suppression processing specification shown in FIG. 22A to the tailing suppression processing specification shown in FIG. 22C.

For example, as shown in FIG. 22C, the tailing suppression setting information is changed so that ApPlyLine or Pattern to a to-be-detected line width (BkLineCnt) is increased by 2 lines. The position (EdgeLine) from the lower end of the edge of the culling pattern takes into consideration one line added to the lower end of the edge by deducting one line from the default 1 line to obtain 0 line. The changed tailing suppression processing specification is stored in the tailing suppression setting storage unit 2354.

By performing the above change of the tailing suppression processing specification, the culling processing for the tailing suppression can be performed in consideration of a change in the position of the lower end of the edge of the line image (object) and a change in the line width due to the line width correction processing. Specifically, the tailing suppression processing specification of the tailing suppression processing is set based on the line width correction setting of the line width correction processing (the line width correction setting of the sub scanning direction in particular).

It is noted that the ROM 113 also may store in advance all of the default tailing suppression processing specification, the tailing suppression processing specification for the vertical line correction level 1, and the tailing suppression processing specification for the vertical line correction level 2. In this case, the tailing suppression processing specification required to execute the tailing suppression setting flow is read from the ROM 113 and is stored in the tailing suppression setting storage unit 2354. Alternatively, only the default tailing suppression processing specification also may be stored in advance in the ROM 113. In this case, the tailing suppression processing specification for the vertical line correction level 1 or 2 required to execute the tailing suppression setting flow is generated from the default tailing suppression processing specification and is stored in the tailing suppression setting storage unit 2354.

<Final Output Result by Change of Tiling Suppression Processing Specification>

Figure 23:
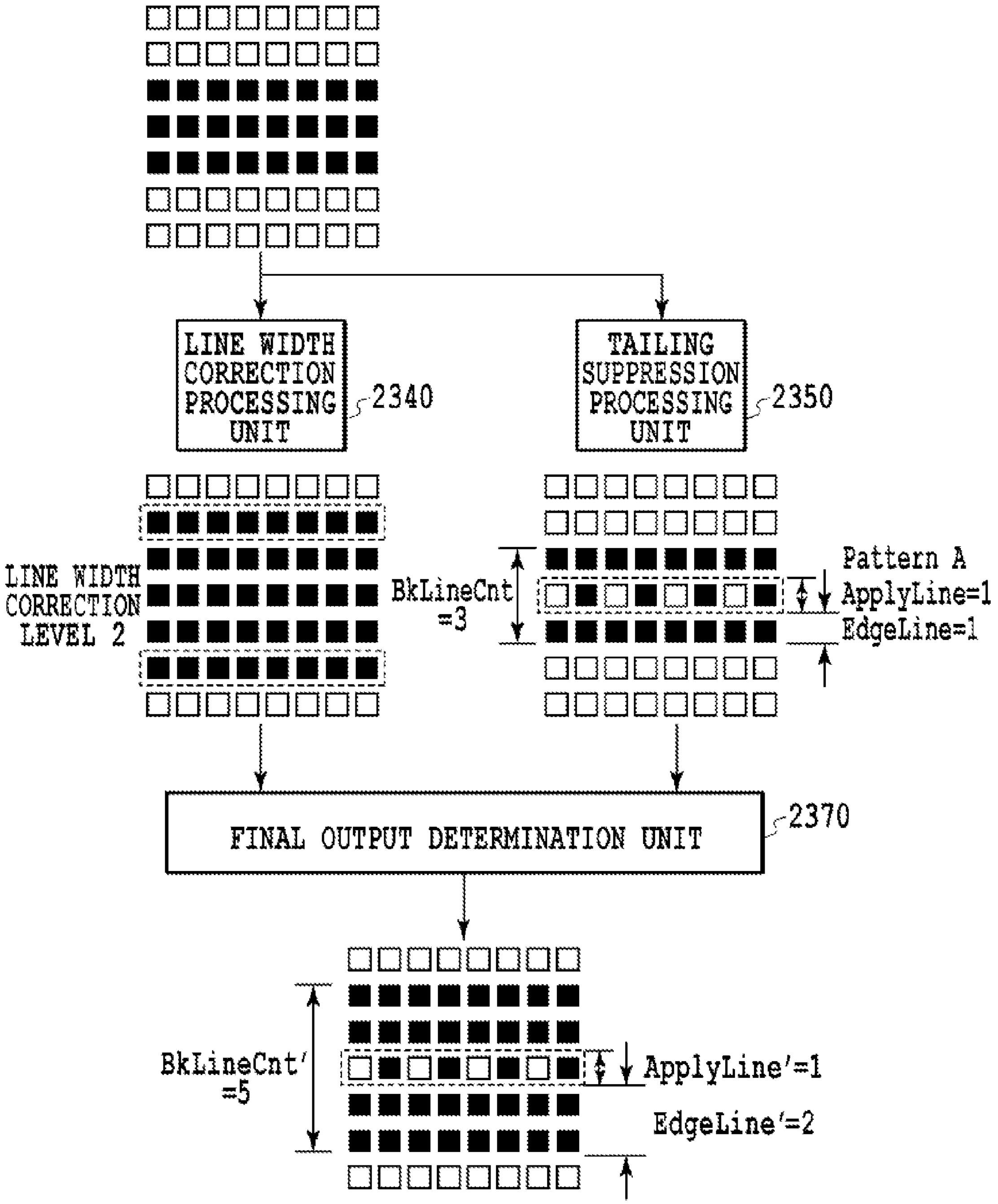
FIG. 23 illustrates an example of the input/output pixel data of the line width correction processing unit, the tailing suppression processing unit, and the final output determination unit in a case where the tailing suppression processing setting flow of Embodiment 1 is not performed.
Figure 24:
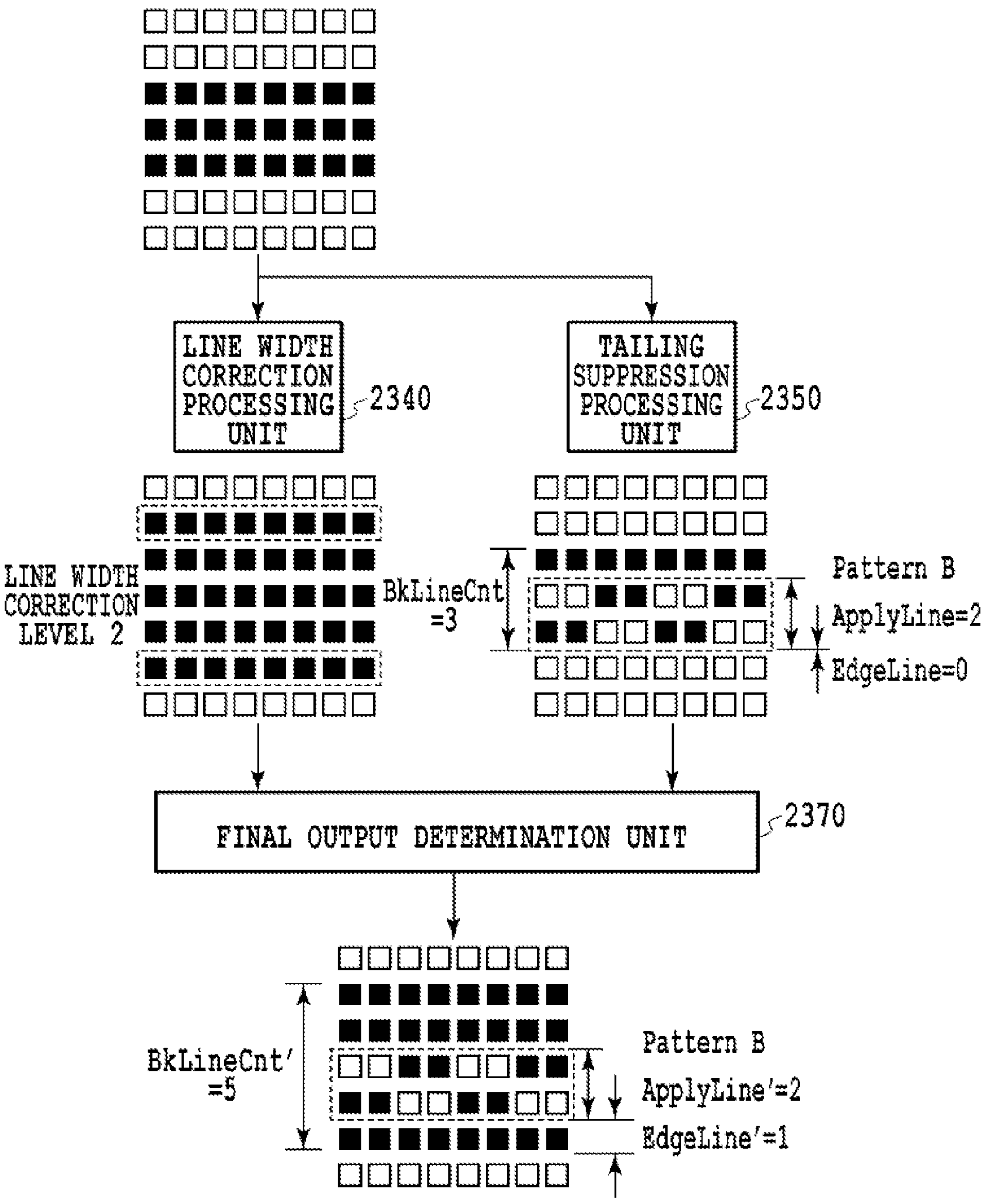
FIG. 24 illustrates an example of the input/output pixel data of the line width correction processing unit, the tailing suppression processing unit, and the final output determination unit in a case where the tailing suppression processing setting flow of Embodiment 1 is performed.

FIG. 24 illustrates an example of the input/output pixel data of the respective processing units, with regard to the line width correction processing unit 2340, the tailing suppression processing unit 2350, and the final output determination unit 2370, in a case where the above-mentioned tailing suppression processing setting flow is executed (or in a case where a change in the tailing suppression processing specification is executed). For comparison, FIG. 23 also illustrates the input/output pixel data of the respective processing units, with regard to the line width correction processing unit 2340, the tailing suppression processing unit 2350, and the final output determination unit 2370, in a case where the tailing suppression processing setting flow of this embodiment is not executed (in a case where no change is made in the tailing suppression processing specification). The following section will describe an example in which the final output determination unit 2370 sets the functions of the toner save processing unit 2330 and the dot dispersion processing unit 2360 to OFF.

FIG. 23 illustrates the input/output pixel data of the line width correction processing unit, the tailing suppression processing unit, and the final output determination unit in a case where the pixel data of a 3 line image is inputted and the tailing suppression processing setting flow of this embodiment is not executed. Specifically, FIG. 23 shows the input/output pixel data of the respective processing units in a case where the line width correction processing of the vertical line correction level 2 shown in FIG. 20B and the tailing suppression processing based on the default tailing suppression processing specification shown in FIG. 22A are executed.

First, with regard to the input pixel data of the 3 line image, the line width correction processing unit 2340 outputs the pixel data of a 5 line image obtained by adding one line to the upper and lower sides of the input pixel data of the 3 line image, respectively. On the other hand, the tailing suppression processing unit 2350 executes the tailing suppression processing based on the default tailing suppression processing specification shown in FIG. 22A according to which BkLineCnt corresponds to the 3 line image (ApplyLine=1, EdgeLine=1, and PatternA). As a result, the pixel data of the 3 line image is outputted that is obtained by culling the pixels of the one center line as shown in PatternA. Then, the final output determination unit 2370 performs a pixel value comparison by comparing the input pixel data with the pixel data after the line width correction processing and the tailing suppression processing to thereby output the pixel data of the 5 line image obtained by culling the pixels of the one center line corresponding to the final output pixel data.

However, in the case of the above method of culling the final output pixel data, the lines of the black pixel corresponding to 2 lines remains at the lower end of eth edge in the conveying direction. Furthermore, the use of a culling width of 1 line is not appropriate for the pixel data of 5 lines, thus failing to provide a desired tailing suppression effect.

In contrast to FIG. 23, FIG. 24 illustrates the input/output pixel data of the line width correction processing unit, the tailing suppression processing unit, and the final output determination unit in a case where the pixel data of the 3 line image is inputted and the tailing suppression processing setting flow of this embodiment is executed. Specifically, FIG. 24 illustrates the input/output pixel data of the respective processing units in a case where the line width correction processing of the vertical line correction level 2 shown in FIG. 20B and the culling processing based on the tailing suppression processing specification for the vertical line correction level 2 shown in FIG. 22C are executed.

In FIG. 24, the tailing suppression processing unit 2350 performs the culling processing based on the tailing suppression processing specification for the vertical line correction level 2 shown in FIG. 22C according to which BkLineCnt corresponds to 3 lines (ApplyLine=2, EdgeLine=0, PatternB). As a result, the pixel data of the 3 line image is outputted that is obtained by culling the pixels of 2 lines from the lower end of the edge as shown in PatternB. Then, the final output determination unit 2370 performs a pixel value comparison by comparing the input pixel data with the pixel data after the line width correction processing and the tailing suppression processing. By the pixel value comparison, a final output image of the pixel data of a 5 line image is outputted that is obtained by culling pixels of a 2 line width from the position one line above from the lower end of the edge (the second line from the lower end of the edge) in the upper direction. In this manner, the default tailing suppression processing specification shown in FIG. 22A realizes a desired tailing suppression processing that corresponds to the processing specification for a 5 line image (BkLineCnt=5) and that is adapted to a change in the edge region due to the line width correction processing.

Figure 25A:
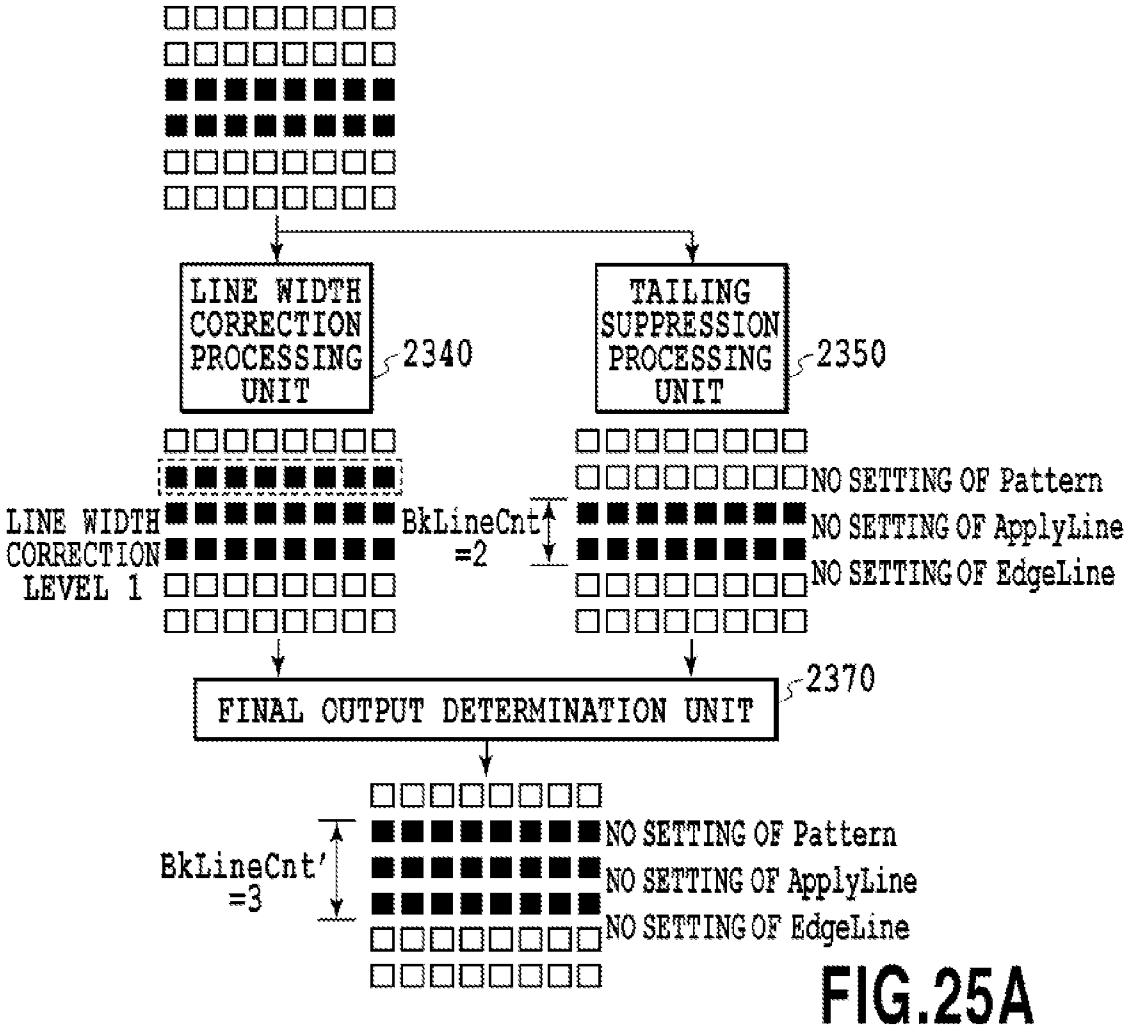
FIG. 25A and FIG. 25B illustrate another example of the input/output pixel data of the line width correction processing unit, the tailing suppression processing unit, and the final output determination unit in a case where the tailing suppression processing setting flow of Embodiment 1 is not performed.

Next, as another example, FIG. 25A illustrates the input/output pixel data of the line width correction processing unit, the tailing suppression processing unit, and the final output determination unit in a case where the pixel data of a 2 line image is inputted and the tailing suppression processing setting flow of this embodiment is not executed. Specifically, FIG. 25A illustrates the input/output pixel data of the respective processing units in a case where the line width correction processing of the vertical line correction level 1 shown in FIG. 20A and the tailing suppression processing based on the default tailing suppression processing specification shown in FIG. 22A are executed.

Figure 25B:
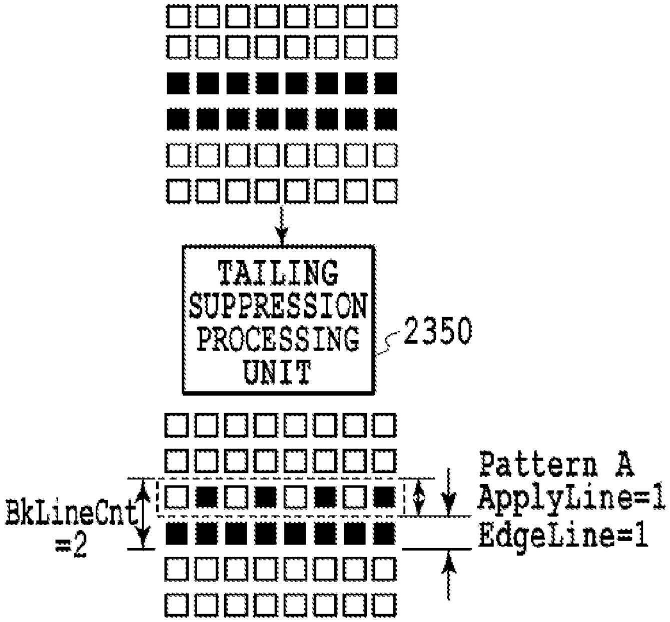

First, with regard to the input pixel data of the 2 line image, the line width correction processing unit 2340 outputs the pixel data of 3 line image that is obtained by adding one line to the upper side of the 2 line image. On the other hand, the tailing suppression processing unit 2350 executes a culling processing based on the default tailing suppression processing specification shown in FIG. 22A according to which BkLineCnt corresponds to 2 lines. In this case, there is no setting in ApplyLine, EdgeLine, and Pattern with regard to BkLineCnt=2. Thus, the pixel data of the 2 line image is directly outputted. The reason why the default tailing suppression processing specification specifies that no culling processing is performed with regard to the pixel data of the 2 line image is that, as shown in FIG. 25B, an uneven edge of the line image after the culling processing is undesirably conspicuous, thus causing a high impact on the deterioration of the image due to the culling processing.

Then, the final output determination unit 2370 performs a pixel value comparison by comparing the input pixel data with the pixel data after the line width correction processing and the tailing suppression processing to output, as a final output image, the pixel data of the 3 line image that is not subjected to a pixel culling. Specifically, in order to increase the tailing suppression effect, a culling processing to the pixel data of the 3 line image is required. However, the final output pixel data of FIG. 25A is not subjected to a culling processing for tailing suppression.

Figure 26:
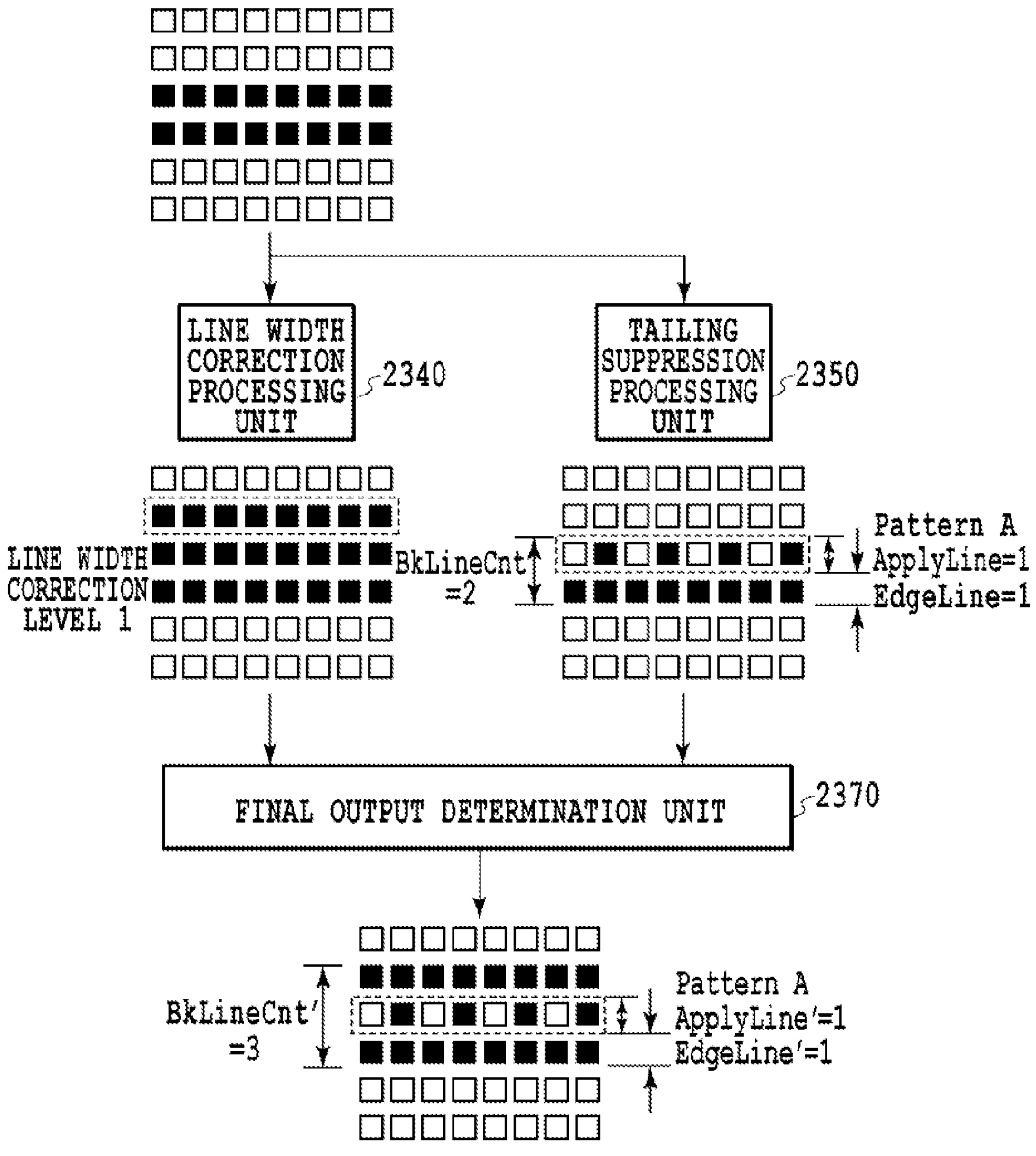
FIG. 26 illustrates another example of the input/output pixel data of the line width correction processing unit, the tailing suppression processing unit, and the final output determination unit in a case where the tailing suppression processing setting flow of Embodiment 1 is performed.

On the other hand, FIG. 26 shows the input/output pixel data of the line width correction processing unit, the tailing suppression processing unit, and the final output determination unit in a case where the pixel data of the 2 line image is inputted and the tailing suppression processing setting flow of this embodiment is executed. Specifically, FIG. 26 shows the input/output pixel data of the respective processing units in a case where the line width correction processing of the vertical line correction level 1 shown in FIG. 20B and the culling processing setting for the vertical line correction level 1 shown in FIG. 22B are executed.

With reference to FIG. 26, the tailing suppression processing unit 2350 subjects the input pixel data shown in FIG. 25A to the tailing suppression processing based on the tailing suppression processing specification for the vertical line correction level 1 shown in FIG. 22B and BkLineCnt corresponds to 2 line (ApplyLine=1, EdgeLine=1, PatternA). As a result, pixels of the 2 line image are outputted that are obtained by culling the pixels one line above from the lower end of the edge (the second line from the lower end of the edge) as show in PatternA. Then, the final output determination unit 2370 performs a pixel value comparison by comparing the input pixel data with the pixel data after the line width correction processing and the tailing suppression processing to output, as a final output image, the pixel data of the 3 line image obtained by culling the pixels of the one line from the lower end of the edge. This corresponds, in the default tailing suppression processing specification shown in FIG. 22A, the processing specification with regard to the 3 line image (BkLineCnt=3). In this manner, the culling processing is performed also in a case where the line width correction processing causes the line image width to reach the number requiring the culling processing for tailing suppression (BkLineCnt of 3 lines or more).

As described above, in this embodiment, the binary image processing unit 120 having the shared buffer unit 2310 is provided. A control is provided so that the setting of the tailing suppression processing unit is changed depending on the setting of an internal line width correction processing unit. As a result, the tailing suppression effect and the image quality comparable to the conventional case can be realized with a lower-cost configuration.

In this embodiment, the line width correction processing unit 2340 has the input data We of a 3×3 pixel group and provides the line width correction on the basis of a unit of 1 line in any of the upper, lower, left and right directions. However, the We pixel group having a different size also can be used to perform the line width correction processing with an arbitrary line number. The line width correction processing unit 2340 provides the line width correction based on one line unit and a plurality of line units. The setting of the line width correction processing unit includes the line number used as a unit to detect the edge neighboring region subjected to the line width correction. In this case, in a case of assuming that the line number N is added by the line width correction processing unit 2340, then the tailing suppression setting of the tailing suppression processing unit 2350 can be changed by dislocating the default tailing suppression setting in an amount corresponding to N lines.

Similarly, in this embodiment, the tailing suppression processing unit 2350 has the input data Wd of the 9×9 pixel group to detect a line image. However, the Wd pixel group having a different size also can be used to realize the tailing suppression processing to a line image having an arbitrary black line width. In this case, the tailing suppression processing setting may be set so that the tailing suppression setting information (tailing suppression processing specification) is set to the line width depending on the size of Wd.

In this embodiment, no change is made in the tailing suppression setting in a case where the line width correction processing unit 2340 performs the line width correction processing in left and right directions (in a case where the horizontal line correction level is set to 1 or 2). However, as in the vertical line correction level, the tailing suppression setting also can be changed depending on the set value of the horizontal line correction level.

Embodiment 2

In Embodiment 1, a change in the tailing suppression setting is made by the CPU 112 of the controller unit 101. However, in this embodiment, the configurations of the plump processing unit 2340 and the culling processing unit 2350 will be described that can change the tailing suppression setting by the tailing suppression processing unit 2350.

<Binary Image Processing Unit>

Figure 27:
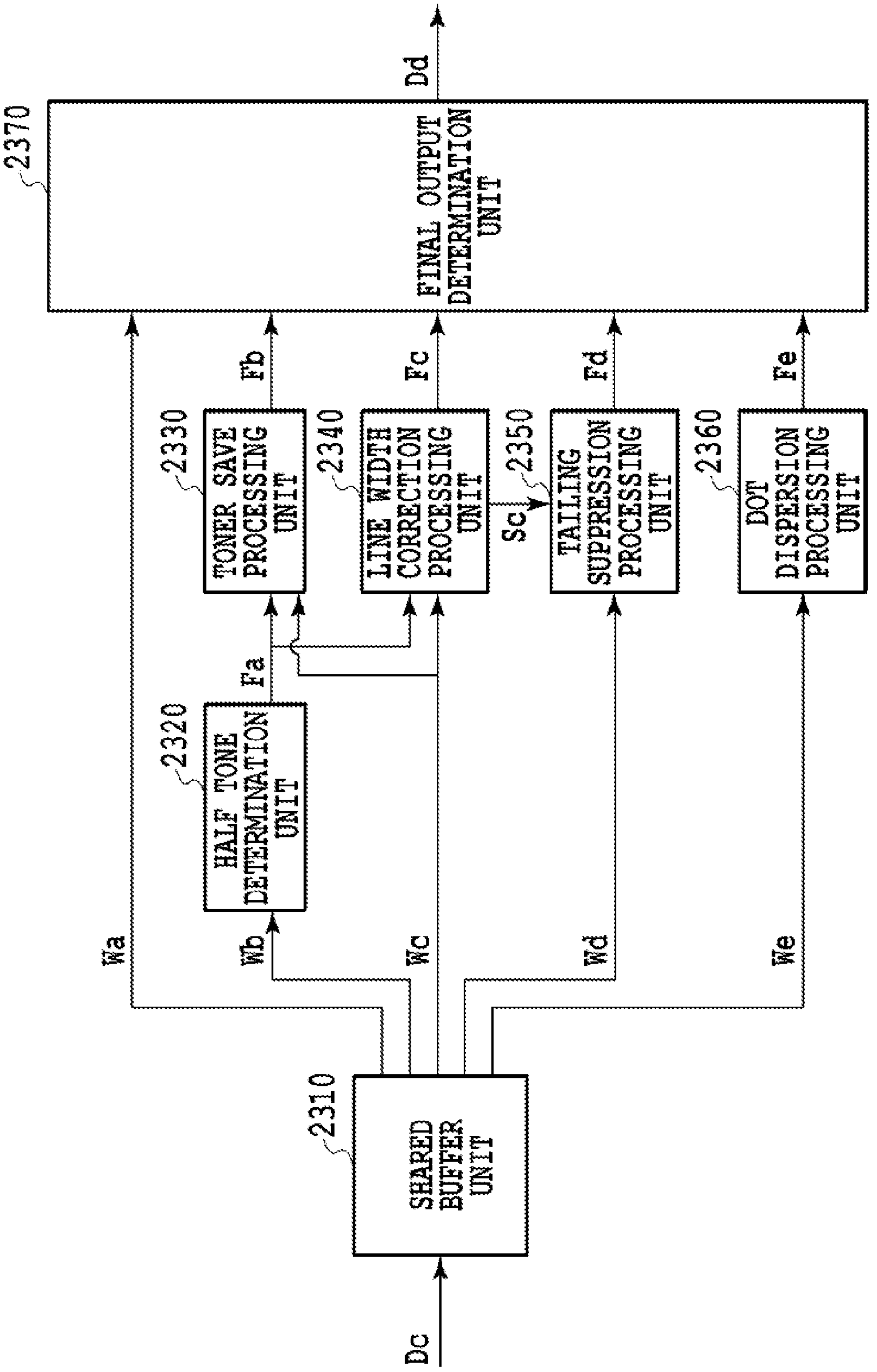
FIG. 27 illustrates an example of the configuration of the binary image processing unit of Embodiment 2.

FIG. 27 is a block diagram illustrating the details of the binary image processing unit 120 in this embodiment. The binary image processing unit 120 in this embodiment is different from the binary image processing unit 120 of Embodiment 1 shown in FIG. 3 in that an additional signal Sc is output from the line width correction processing unit 2340 to the tailing suppression processing unit 2350. The signal Sc is used to send the line width correction setting information (e.g., the setting value of the vertical line correction level) in the line width correction processing unit 2340 to the tailing suppression processing unit 2350.

<Tailing Suppression Processing Unit>

Figure 28:
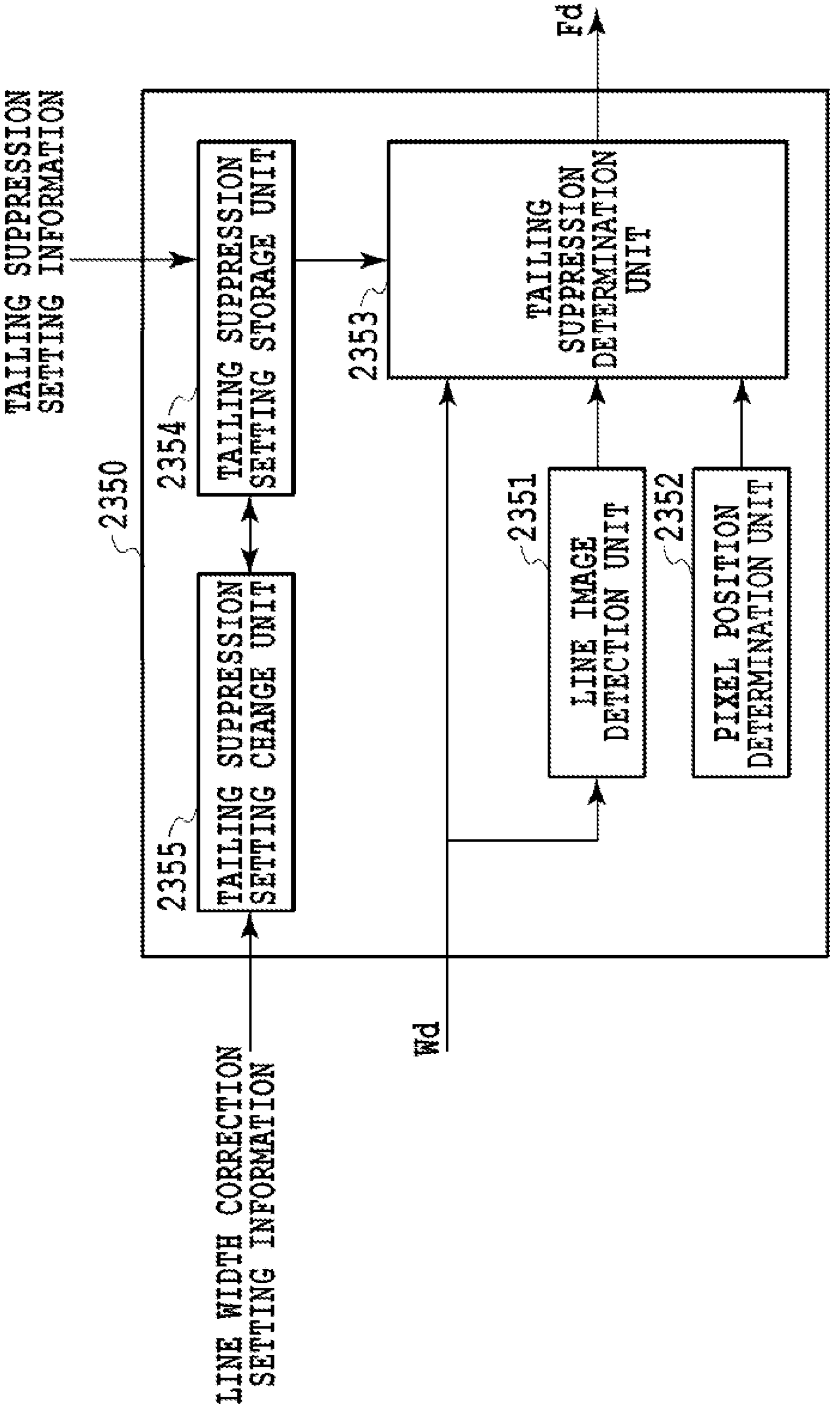
FIG. 28 illustrates an example of the configuration of the tailing suppression processing unit of Embodiment 2.

FIG. 28 illustrates the tailing suppression processing unit 2350 in Embodiment 2. The tailing suppression processing unit 2350 in Embodiment 2 is different from the tailing suppression processing unit 2350 of Embodiment 1 shown in FIG. 13 in that the tailing suppression setting change unit 2355 is added. The tailing suppression setting change unit 2355 receives, via the signal Sc, the line width correction setting information from the line width correction processing unit 2340 and changes the tailing suppression setting as in Embodiment 1. Then, the changed culling suppression setting is stored in the tailing suppression setting storage unit 2354.

<Tailing Suppression Processing Setting Flow>

Figure 29:
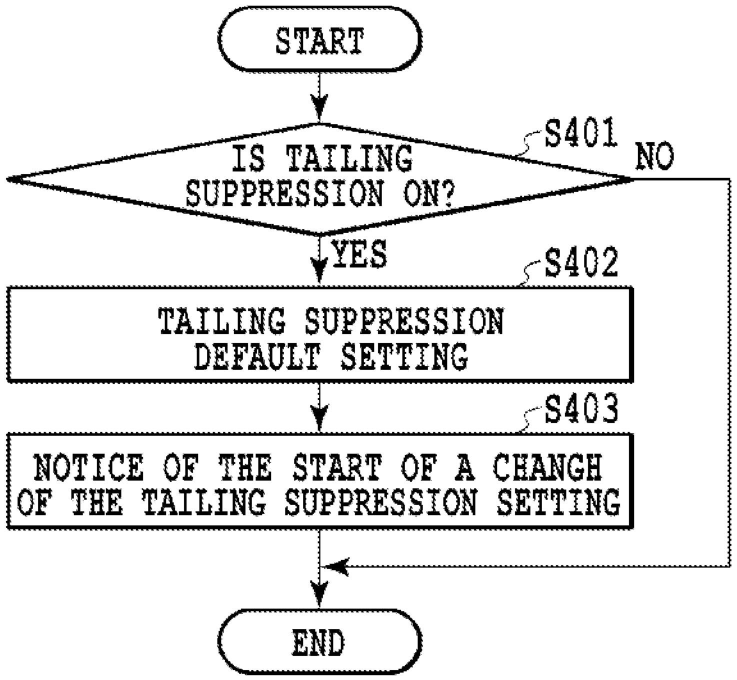
FIG. 29 is a flowchart illustrating the tailing suppression processing setting executed by the CPU of Embodiment 2.

FIG. 29 is a flowchart illustrating the tailing suppression processing setting executed by the CPU 112 in the controller unit 101 in Embodiment 2. FIG. 29 specifically shows S104 in FIG. 17 as in Embodiment 1. Step S401 and Step S402 are the same as Step S301 and Step S302 of tailing suppression processing setting flow in Embodiment 1 shown in FIG. 21.

In Step S401 and Step S402, after the default tailing suppression processing setting to the tailing suppression processing unit 2350 is completed, in Step S403, the CPU 112 notifies the tailing suppression processing unit 2350 of the start of a change of the tailing suppression setting. Upon receiving the notification, the tailing suppression processing unit 2350 starts the internal change of the tailing suppression setting as described alter with reference to FIG. 30.

Figure 30:
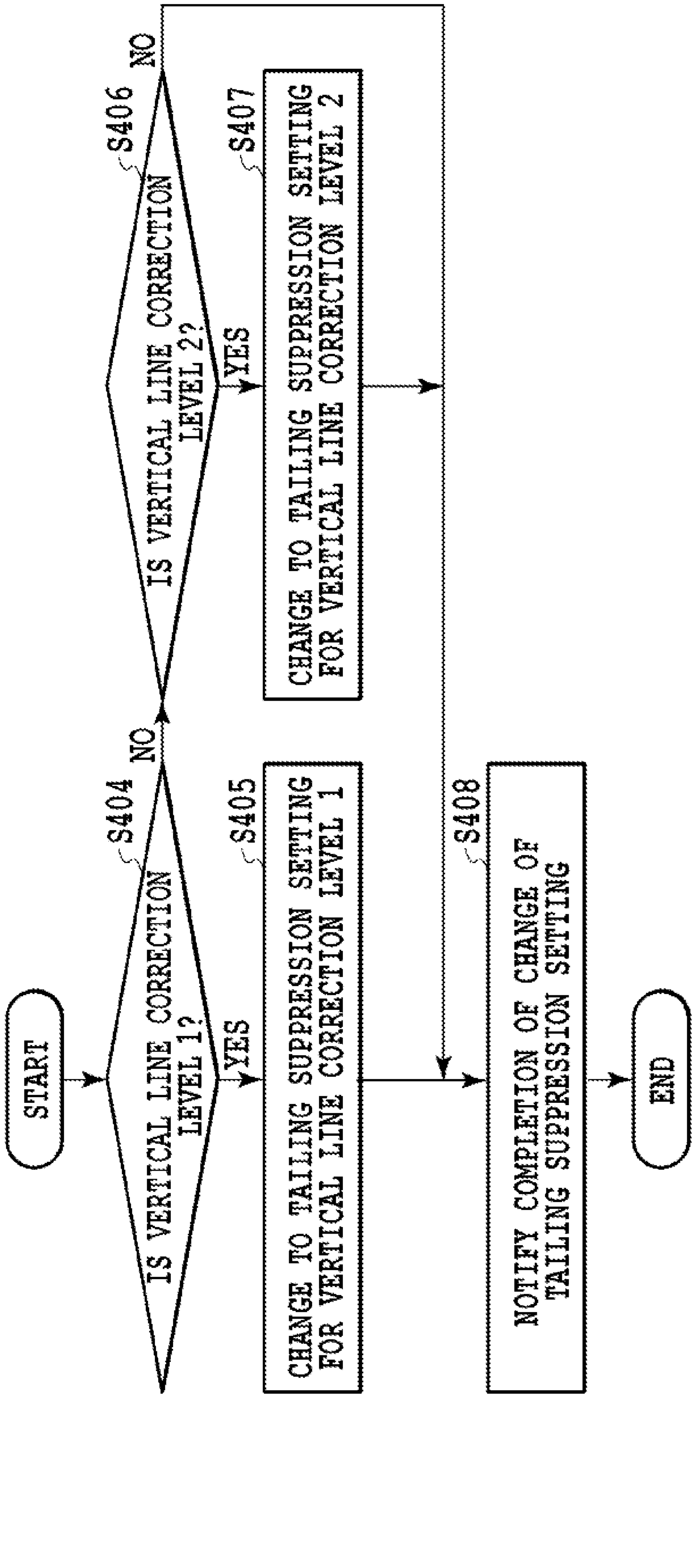
FIG. 30 is a flowchart illustrating the tailing suppression processing setting executed by the tailing suppression processing unit of Embodiment 2.

FIG. 30 illustrates the flowchart of the tailing suppression processing setting executed by the tailing suppression processing unit 2350 in Embodiment 2. Steps S404 to S407 are the same as Steps S303 to S306 of the tailing suppression processing setting flow in Embodiment 1 shown in FIG. 21. A difference therebetween is that the tailing suppression processing unit 2350 instead of the CPU 112 executes the flow.

After the change of the tailing suppression setting by the tailing suppression processing unit 2350 in Steps S404 to S407 is completed, in Step S408, the tailing suppression processing unit 2350 notifies the CPU 112 of the completion of the change of the tailing suppression setting. Upon receiving this notification, the CPU 112 may start executing the image forming processing of the white black printer 100 described in S105 of FIG. 17.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer, for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-273672, filed Dec. 14, 2012 which are hereby incorporated by reference herein in their entirety.

What is claimed is:

1. An image forming apparatus, comprising:
- a buffer that stores an image;
- a line width correction processing unit that receives the stored image from the buffer, detects an edge neighboring region of an object in the received image in a predetermined direction and subjects the detected edge neighboring region to a line width correction processing;
- a determination unit that determines setting information based on the predetermined direction; and
- a tailing suppression processing unit that receives the stored image from the buffer, and subjects the received image to a culling processing to suppress a tailing, on a basis of the determined setting information,
- wherein the line width correction processing unit and the tailing suppression processing unit are arranged for parallel processing.

2. The image forming apparatus according to claim 1, wherein the buffer outputs a common pixel group including a target pixel to the line width correction processing unit and the tailing suppression processing unit.

3. The image forming apparatus according to claim 2, further comprising a final output determination unit that outputs, in a case where at least one of a pixel value of the target pixel resulting from the line width correction processing unit and a pixel value of the target pixel resulting from the tailing suppression processing unit is different from a pixel value of the output target pixel, a pixel value other than the pixel value of the output target pixel as a final pixel value of the target pixel.

4. The image forming apparatus according to claim 3, wherein a pixel value is either a first predetermined value or a second predetermined value.

5. The image forming apparatus according to claim 1, further comprising a toner save processing unit that receives the image from the buffer and subjects the received image to a toner save processing, and a dot dispersion processing unit that receives the image from the buffer and subjects the received image to a dot dispersion processing, wherein the line width correction processing unit, the tailing suppression processing unit, the toner save processing unit, and the dot dispersion processing unit are arranged for parallel processing.

6. The image forming apparatus according to claim 5, wherein the buffer outputs a common pixel group including a target pixel to any of the toner save processing unit, the line width correction processing unit, the dot dispersion processing unit, and the tailing suppression processing unit for parallel processing.

7. The image forming apparatus according to claim 6, further comprising a final output determination unit that outputs, in a case where at least one of a pixel value of the target pixel resulting from the toner save processing unit, a pixel value of the target pixel resulting from the line width correction processing unit, a pixel value of the target pixel resulting from the dot dispersion processing unit, and a pixel value of the target pixel resulting from the tailing suppression processing unit is different from a pixel value of the output target pixel, a pixel value other than the pixel value of the output target pixel as a final pixel value of the target pixel.

8. The image forming apparatus according to claim 7, wherein a pixel value is either a first predetermined value or a second predetermined value.

9. The image forming apparatus according to claim 1, wherein the tailing suppression processing unit detects a line image region of the received image to subject the detected line image region to the culling processing.

10. The image forming apparatus according to claim 9, wherein the setting information includes a culling pattern type and a position of a culling processing line in the line image region, and the culling pattern type is specified while being associated with a width of the line image region and is to be applied to the line image region.

11. The image forming apparatus according to claim 9, wherein the tailing suppression processing unit determines the line image region based on a number or ratio of black pixels in a line.

12. The image forming apparatus according to claim 1, wherein the object in the received image corresponds to a black pixel region and the line width correction processing unit detects the edge neighboring region in the predetermined direction by determining whether or not a target pixel in the received image is a white pixel at a boundary in the predetermined direction between a black pixel and a white pixel.

13. The image forming apparatus according to claim 12, wherein the line width correction processing unit detects, as the edge neighboring region, the target pixel which is determined to be the white pixel at the boundary by the determination.

14. The image forming apparatus according to claim 13, wherein the line width correction processing unit subjects the detected edge neighboring region to the line width correction processing by converting the white target pixel into a black target pixel.

15. The image forming apparatus according to claim 1, wherein the determination unit determines, based on the predetermined direction, the setting information from among a plurality of pieces of setting information.

16. The image forming apparatus according to claim 15, wherein each of the pieces of setting information indicates at least one culling pattern of white and black pixels.

17. The image forming apparatus according to claim 16, wherein each of the pieces of setting information indicates a set of combinations of a culling pattern of white and black pixels and a width of a detected black line for which the culling pattern is applied, and wherein each set is different.

18. The image forming apparatus according to claim 17, wherein the tailing suppression processing unit detects a black line in the received image, determines a width of the detected black line, determines the culling pattern of one combination corresponding to the determined width, of the set indicated by the determined setting information, and converts a black pixel of the detected black lines corresponding to a white pixel in the determined culling pattern into a white pixel.

19. The image forming apparatus according to claim 16, wherein each of the pieces of setting information indicates a set of combinations of a culling pattern of white and black pixels, a width of a detected black line for which the culling pattern is applied, and a position in the detected black line at which the culling pattern is applied.

20. The image forming apparatus according to claim 19, wherein the tailing suppression processing unit detects a black line in the received image, determines a width of the detected black line, determines the culling pattern and the position of one combination corresponding to the determined width, of the set indicated by the determined setting information, and converts a black pixel of the detected black lines corresponding to a white pixel in the determined culling pattern applied at the determined position in the detected black line into a white pixel.

* * * * *